US010037263B1

(12) United States Patent
Kegley et al.

(10) Patent No.: US 10,037,263 B1
(45) Date of Patent: Jul. 31, 2018

(54) METHODS, SYSTEMS, AND ARTICLES OF MANUFACTURE FOR IMPLEMENTING END-TO-END AUTOMATION OF SOFTWARE SERVICES

(71) Applicant: INTUIT INC., Mountain View, CA (US)

(72) Inventors: Linda Maureen Kegley, San Diego, CA (US); Evan Hang, San Diego, CA (US); Zeeshan Ahmad Anwar, San Diego, CA (US); Maneesha Ashok Godhwani, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 162 days.

(21) Appl. No.: 15/220,860

(22) Filed: Jul. 27, 2016

(51) Int. Cl.
  *G06F 9/44* (2018.01)
  *G06F 11/36* (2006.01)

(52) U.S. Cl.
  CPC ...... *G06F 11/3672* (2013.01); *G06F 11/3684* (2013.01); *G06F 11/3688* (2013.01)

(58) Field of Classification Search
  CPC ............. G06F 11/3672; G06F 11/3688; G06F 11/3684
  USPC ........................................................ 717/124
  See application file for complete search history.

(56) References Cited

U.S. PATENT DOCUMENTS

| 5,854,889 A * | 12/1998 | Liese | H04L 43/50 |
| | | | 714/32 |
| 6,718,537 B1 * | 4/2004 | Miles | G06F 11/3688 |
| | | | 717/127 |
| 7,457,989 B2 * | 11/2008 | Ulrich | G06F 11/3688 |
| | | | 717/124 |
| 8,104,022 B2 * | 1/2012 | Krauss | G06F 9/4484 |
| | | | 717/127 |
| 9,032,373 B1 * | 5/2015 | Gupta | G06F 11/3688 |
| | | | 717/127 |
| 9,959,201 B2 * | 5/2018 | Abdirashid | G06F 11/3692 |
| 2003/0097650 A1 * | 5/2003 | Bahrs | G06F 11/3688 |
| | | | 717/124 |
| 2004/0015846 A1 * | 1/2004 | Haisraeli | G06F 9/52 |
| | | | 717/115 |
| 2006/0075303 A1 * | 4/2006 | Ulrich | G06F 11/3672 |
| | | | 714/38.14 |
| 2008/0256517 A1 * | 10/2008 | Atkin | G06F 11/3688 |
| | | | 717/124 |

(Continued)

OTHER PUBLICATIONS

Bryce et al. "Developing a Single Model and Test Prioritization Strategies for Event-Driven Software", Jan. 2010, IEEE.*

(Continued)

*Primary Examiner* — Wei Zhen
*Assistant Examiner* — Junchun Wu
(74) *Attorney, Agent, or Firm* — Vista IP Law Group LLP

(57) ABSTRACT

Various aspects described herein are directed to a method and a system that implement end-to-end automation of software services. A set of test cases may be identified from existing test cases or determined anew for a software system. Virtual test results may be generated at least by executing the set of test cases in parallel on a virtual time or date. The virtual test results may then be used to validate or verify the behaviors of the software system. The virtual time or date is then advanced to the next virtual time or date by a temporal period until a stopping criterion is satisfied.

27 Claims, 13 Drawing Sheets

(56) References Cited

U.S. PATENT DOCUMENTS

| | | | |
|---|---|---|---|
| 2010/0058294 A1* | 3/2010 | Best | G06F 8/71 |
| | | | 717/122 |
| 2011/0145653 A1* | 6/2011 | Broadfoot | G06F 11/3604 |
| | | | 714/38.1 |
| 2012/0159448 A1* | 6/2012 | Arcese | G06F 11/28 |
| | | | 717/124 |
| 2013/0014084 A1* | 1/2013 | Sahibzada | G06F 11/368 |
| | | | 717/124 |
| 2013/0047140 A1* | 2/2013 | Shann | G06F 11/3664 |
| | | | 717/128 |
| 2014/0026122 A1* | 1/2014 | Markande | G06F 11/3664 |
| | | | 717/124 |
| 2014/0026123 A1* | 1/2014 | Dhanapal | G06F 11/3664 |
| | | | 717/124 |
| 2014/0109052 A1* | 4/2014 | Tempel | G06F 9/45558 |
| | | | 717/124 |
| 2015/0007140 A1* | 1/2015 | Boshernitsan | G06F 11/368 |
| | | | 717/124 |

OTHER PUBLICATIONS

Shah et al. "Mining process models and architectural components from test cases", 2015, IEEE.*
Yu et al, "Test Case Generation for Collaborative Real-time Editing Tools", 2007, IEEE.*
Bertolini et al. "Test Case Generation Using Stochastic Automata Networks: Quantitative Analysis", 2004, IEEE.*

* cited by examiner

METHODS, SYSTEMS, AND ARTICLES OF MANUFACTURE FOR IMPLEMENTING END-TO-END AUTOMATION OF SOFTWARE SERVICES

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Delivery and licensing models such as Software as a Service (SaaS), Platform as a Service (PaaS), Infrastructures as a Service (IaaS), other similar on-demand software such as subscription based models, etc. have increasingly gained popularity, especially in business software applications. With these models, users may access the provided services using a client (e.g., a thin client) via web browsers or mobile applications on mobile computing devices. More such models have been implemented under the end-to-end computer networking architecture where features or services reside in the end nodes of the computer network, while the users reside on the other end of the computer network. An end-to-end computer networking architecture addresses the shortcomings of conventional software delivery and licensing models because the provided services and applications may need to be modified, and new features, applications, or services may be added to the provided services. Each modification or addition of the provided services incurs costs. Yet for the aforementioned services, not all users use or are licensed to use all the services. For example, a subscriber under a subscription based license may be authorized only a small subset of all the services provided.

Testing the functional and non-functional behaviors of these systems has been a challenging task. A team of engineers often needs to develop test cases to validate the behaviors of a system, and these test cases need to be orchestrated and are often performed in series in the computing platform because one test case may require one or more specific environment and/or system states that may be incompatible or inconsistent with another test. For example, testing a billing system or module for a subscription based service may require a team of engineers to develop a large number of test cases that will be executed to generate various test results.

Conventional approaches initiate test sessions in which these test cases are executed in series. More specifically, when a first test case is executing to generate various test results, the other test cases need to wait for the completion of the first test case, validation or verification of the software modules involved in the first test case, and subsequent removal of the test results and reset of various system and environment states before another test case may be started. One immediate drawback of these serial approaches is that testing a software system inevitably requires a long time. Practical experiences have shown that testing a software system typically takes hundreds of engineer-weeks, if not longer, to complete, where an engineer-week indicates a week regarded in terms of the amount of work that may be done by one engineer within this period.

Another drawback is that the test platform including one or more computing nodes and their environments need to be restored and set to the requisite states prior to the initiation of another test session for another test case. The test results generated for the previous test case will be removed during the restore and reset. If there is another issue that is discovered after the restore and reset, the test results have already been removed so any debugging and troubleshooting have to be performed without the supporting test results. This lack of test results increases the difficulties and challenges in effectively debugging and troubleshooting a software system under test.

Some other conventional approaches attempt to address these difficulties by orchestrating the test cases into buckets or groups by an engineer or an architect where test cases sharing the same states or characteristics may be grouped into a single bucket and executed together. Although these conventional approaches improve the overall efficiencies, these buckets are nevertheless executed in series. As a result, these conventional approaches still suffer from the same deficiencies as described above.

Therefore, there exists a need for methods, systems, and computer program products for implementing end-to-end automation of software services to address at least the aforementioned challenges.

SUMMARY

Disclosed are various embodiments relating to methods, systems, and articles of manufacture for implementing end-to-end automation of software services. One or more embodiments are directed at a method for implementing end-to-end automation of software services for services including, for example, Software as a Service (SaaS), Platform as a Service (PaaS), Infrastructures as a Service (IaaS), other similar on-demand software such as subscription based models, etc.

In some embodiments, a set of test cases may be identified from existing test cases or determined anew for a software system. Virtual test results may be generated at least by executing the set of test cases in parallel on a virtual time or date. The virtual test results may then be used to validate or verify the behaviors of the software system. The virtual time or date is then advanced to the next virtual time or date by a temporal period until a stopping criterion is satisfied.

In some of these embodiments, the set of test cases may be identified or determined based in part or in whole upon one or more scenarios of user interactions with the software system; and the virtual time or date may be determined based at least in part or in whole upon information in the set of test cases. The set of test cases may be executed in parallel in one or more test sessions on the one or more computing nodes on the virtual time or date; the billing service module may perform virtual billing services at least by generating virtual billing records and notifications on the virtual time or date; and the virtual billing records and notifications may be transmitted to the one or more test sessions, the set of test cases, or a repository accessible by the set of test cases.

In addition or in the alternative, one or more first test cases may be identified from the set of test cases; a determination may be made to decide whether the virtual test results generated by executing the software system on the virtual time or date include pertinent virtual test results for the one or more first test cases; the behaviors of the software system may be validated or verified with at least the pertinent virtual test results for the one or more first test cases; and anther determination may be made to decide whether an end virtual time or date has been reached.

In some embodiments, a first test case may be identified from the set of test cases; and error or issue handling may be performed for the first test case. In some of these embodiments, a determination may be made to decide whether the virtual test results include pertinent virtual test results for the first test case; the behaviors of the software system may be validated or verified with at least the pertinent virtual test results for the first test case; another determination may be made to decide whether an error or an issue has occurred for the first test case based in part or in whole upon results of validating or verifying the behaviors of the software system with at least the pertinent virtual test results for the first test case; and the execution of the first test case in a first test session may be terminated or paused when it is determined that the error or the issue has occurred for the first test case.

In some of these embodiments, it may be determined whether the first test case, which has been terminated or paused, is to be rejoined into the set of test cases executing in parallel. In response, a first virtual time or date on which the first test case is terminated or paused may be identified; a current virtual time or date may also be identified for the software system; a determination may be made to decide whether one or more significant events have occurred between the first virtual time or date and the current virtual time or date; and another determination may be made to decide whether rejoining the first test case into the set of test cases affects behaviors of one or more other test cases.

In some of these embodiments, a scope of extent of impacts of rejoining the first test case into the set of test cases may be determined or predicted; modifications to the first test case or the software system for resolving the error or the issue may also be determined; the scope of extent of impacts of rejoining the first test case into the set of test cases may then be adjusted based in part or in whole upon the modifications; and the modifications to the first test case or the software system may be implemented based in part or in whole upon one or more first criteria.

In some of these embodiments, the first test case may be rejoined into the set of test cases based in part or in whole upon one or more second criteria; and the first test case may be synchronized to the current virtual time or date at least by retrieving pertinent virtual test results and notifications based in part or in whole upon occurrence and type of one or more significant events between the first virtual time or date and the current virtual time or date.

In some of these embodiments, a no-harm virtual time or date between the first virtual time or date and the current virtual time or date may be determined when it is determined that one or more non-harmless significant events occurred between the first virtual time or date and the current virtual time or date; and one or more affected test cases may be identified from the set of test cases into a reduced set of test cases when the current virtual time or date is reset to the no-harm virtual time or date.

In some of these embodiments, the current virtual time or date may be reset to the first virtual time or date; and first updated virtual test results may be generated for the reduced set of test cases at least by re-executing the reduced set of test cases during a first time period between the first virtual time or date and the no-harm virtual time or date.

In some of these embodiments, the current virtual time or date may be reset to the no-harm virtual time or date; and second updated virtual test results may be generated for the first test case at least by re-executing the first test case during a second time period between the no-harm virtual time or date and the current virtual time or date.

Certain embodiments are directed at an apparatus that implement various processes described herein for implementing end-to-end automation of software services. More additional details about the apparatus for implementing various processes will be described in some of the subsequent paragraphs with reference to one or more drawing figures.

Certain embodiments are directed at an article of manufacture having stored thereupon a sequence of instructions which, when executed by a mobile computing or communication device, causes the mobile computing or communication device to perform various processes or to invoke various modules described herein. More details about the article of manufacture will be described in some of the subsequent paragraphs with reference to one or more drawing figures.

Further details of various embodiments of the invention are described in the Detailed Description section with reference to respective figures.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only certain embodiments and are not therefore to be considered limiting of its scope, certain embodiments will be described and explained with additional specificity and detail through the use of the accompanying drawings in which.

DETAILED DESCRIPTION OF ILLUSTRATED EMBODIMENTS

Figure 1:
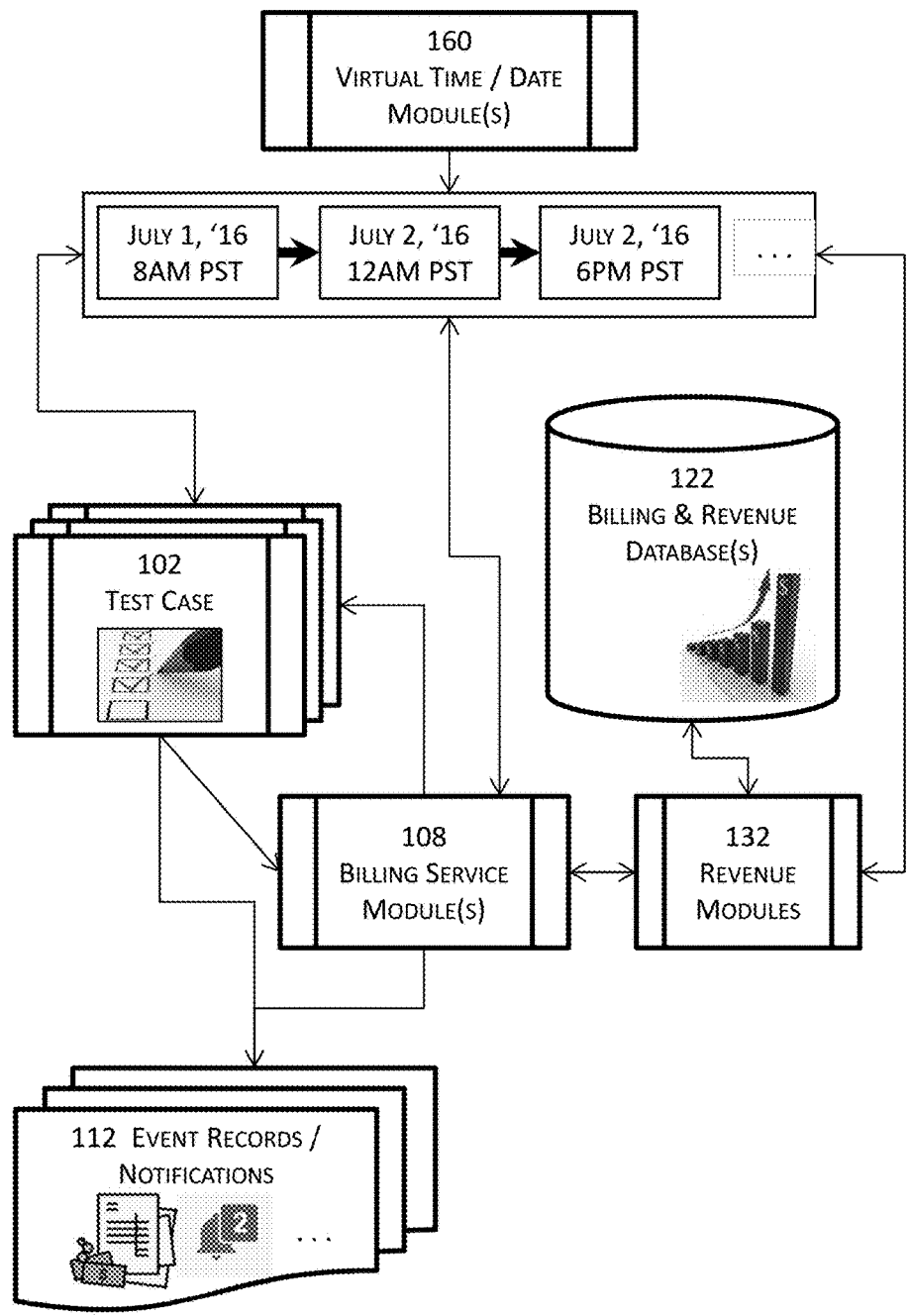
FIG. 1 illustrates a high level block diagram of a system for implementing end-to-end automation of software services in one or more embodiments.

Some embodiments are directed at a method or system that implement end-to-end automation of software services. In these embodiments, a plurality of test cases for testing a software system may be executed in one or more test sessions in parallel although the plurality of test cases may require different testing environments or states of the software system under test. These techniques described herein may select a virtual time or date for a software system to start performing its services and/or functions and advance the virtual time or date with a temporal period until a stopping criteria is reached.

Each time the software system performs its services or functions, the software system generates outputs for one or more test cases of the plurality of test cases and stores these outputs in a repository accessible by at least these test sessions for the plurality of test cases. These outputs are considered virtual records because they are generated in response to one or more of the plurality of test cases. In addition to generating the virtual records, these techniques may also generate and send notifications to one or more computing nodes having test sessions executing the plurality of test cases. Each computing node executing one or more test cases may be notified separately from a central authority or may invoke its respective listening module to determine whether pertinent information has been generated for the virtual time or date by checking the notifications or the virtual records to determine whether these virtual records may be pertinent to the one or more test cases executing on the computing node. If such pertinent information is found, the test session may invoke a local or remote validation module to validate or verify functional and/or non-functional behaviors of the software system.

With or without waiting for validation or verification at these one or more computing nodes to complete, these techniques may then advance the virtual time or date by a temporal period to the next virtual time or date and notify the one or more test sessions and the software system of this next virtual time or date. The output generation by the software systems, execution of the plurality of test cases, validation or verification of behaviors, and advancing the virtual time or date may be repeated until a stopping criterion (e.g., a stop time or date) is fulfilled. With these techniques, as many test cases may be executed simultaneously as the computational capacity allows despite the fact that these concurrently executing test cases may require different states or environments because as the software system under test continues to perform its functions or services as the virtual is incrementally advanced, each test case receives the pertinent information the test case is expecting and thus may complete the test independent of and without waiting for any other test cases to complete.

In an example including a billing service module or a billing system (collectively a billing service module hereinafter) that is under test with a set of test cases associated with a subscription service, the billing service module may perform its functions or services (e.g., generating bills or invoices) on a regular basis. With the techniques described herein, the billing service module may perform its billing function to generate bills on each virtual date that is advanced the next virtual date until a stop criterion is fulfilled. All test cases may be executed concurrently provided that the computational resources allow such concurrent executions while each test case may be separately notified or may listen to the notifications in a repository to retrieve pertinent information such as virtual billing records. Each test case may then use its pertinent information to verify or validate the behaviors of the billing service module. In this example, a subscription based service or any other services for which time is of essence includes highly dynamic transactions that subscribers may, for example, subscribe for different level of services, change the subscribed levels of services, enter a free trial period on different dates, cancel subscribed services, etc. on a daily basis.

This type of highly temporally dependent services are one of the most challenging services for testing purposes due to the highly dynamic nature of the transactions, the potentially large number of subscribers, strict code compliance, and the interactions between the billing service modules and other systems or modules. The frequent additions of new features and modifications of existing features simply renders these software systems even more challenging for testing because the highly competitive nature of the businesses demands much shorter time to market. With the techniques described herein, all test cases may be executed in parallel, and the testing of the system may thus be automated to become much more expedient.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1 illustrates a high level block diagram of a system for implementing end-to-end automation of software services in one or more embodiments. More specifically, FIG. 1 illustrates an example of a billing service module or system 108 that is the software system under test with a plurality of test cases 102 in this example. The plurality of test cases include a plurality of significant events that spread across a plurality of days and thus render orchestration and manual or serial testing of the plurality of test cases difficult. These techniques described herein execute the plurality of test cases in one or more test sessions in parallel.

More specifically, these techniques first identify a beginning virtual time or date from a virtual date module in the billing service modules 108, the billing and revenue modules 132, or as a stand-alone module. The beginning virtual time or date may be pushed to or pulled by the plurality of test cases to, for example, determine whether one or more significant events are to occur at the beginning virtual time or date. The software system under test (the billing service modules 108 in this example) may also be made aware of the beginning virtual time or date and perform their respective functions or services at the beginning virtual time or on the current virtual date to generate virtual event records, notifications, etc. 112.

In this example where the software system under test is a billing service module 108, the virtual event records may include, for example, bills, invoices, etc., and the notifications may take any form for the related test cases to become aware of the availability of pertinent event records at the beginning virtual time or on the beginning virtual date. These virtual event records and notifications 112 may be stored in a repository that is accessible by the one or more test sessions or the plurality of test cases 102 via their respective listener modules or via separate transmissions of notifications to the plurality of test cases 102. The plurality of test cases may then retrieve pertinent virtual event records from the repository and validate or verify the behaviors of the software system under test (e.g., the billing service modules 108). At least some of the virtual event records may also be transmitted to the revenue modules 132 for recognition of revenues and for updating the revenue and billing databases 122.

An end virtual time or date and a temporal period may also be identified at the virtual date module that may advance a virtual time or date to the next virtual time or date by incrementing the virtual time or date with the temporal period until the end virtual time or date is reached. One of the purposes of an end virtual time or date is to exercise control over the total span of time for testing the software system although other stopping criterion may also be used. The temporal period may be a fixed, predetermined temporal period in some embodiments or may be a variable temporal period that may become longer or shorter based on when significant events occur for the plurality of test cases to skip one or more periods of time during which no significant events occur in order to further expedite the completion of the executions of the plurality of test cases and thus to conserve computational resources.

A virtual time or date module 160 may then advance the beginning virtual time or date to the next virtual time or date by incrementing the beginning virtual time or date by the temporal period. This next virtual time or date may again be broadcast to the plurality of test cases 102, the billing service modules 108, and/or the billing and revenue modules 132 that may further perform their respective functions as described above. That is, the generation of virtual event records and notifications, the occurrences of various significant events from the plurality of test cases, the validation or verification of the software system, the recognition of virtual revenues from the virtual billing records and updating of the revenue records, etc. may be repeated for each virtual time or date until a stopping criterion is satisfied (e.g., an end virtual time is reached).

In this example, the plurality of test cases are executed in parallel. Moreover, the entire testing of the software system may be performed without any human intervention once the plurality of test cases have been developed. These test cases may or may not be orchestrated due to the nature of concurrent executions of these test cases. Once all validation, verification, or even debugging is complete, the virtual event records (e.g., virtual bills, invoices, etc.) and notifications may be discarded, and various modules and systems (e.g., the billing service modules 108, the revenue modules 132, etc.) may be reset to the current time or current date so that the virtual event records will not contaminate the actual event records.

Figure 2:
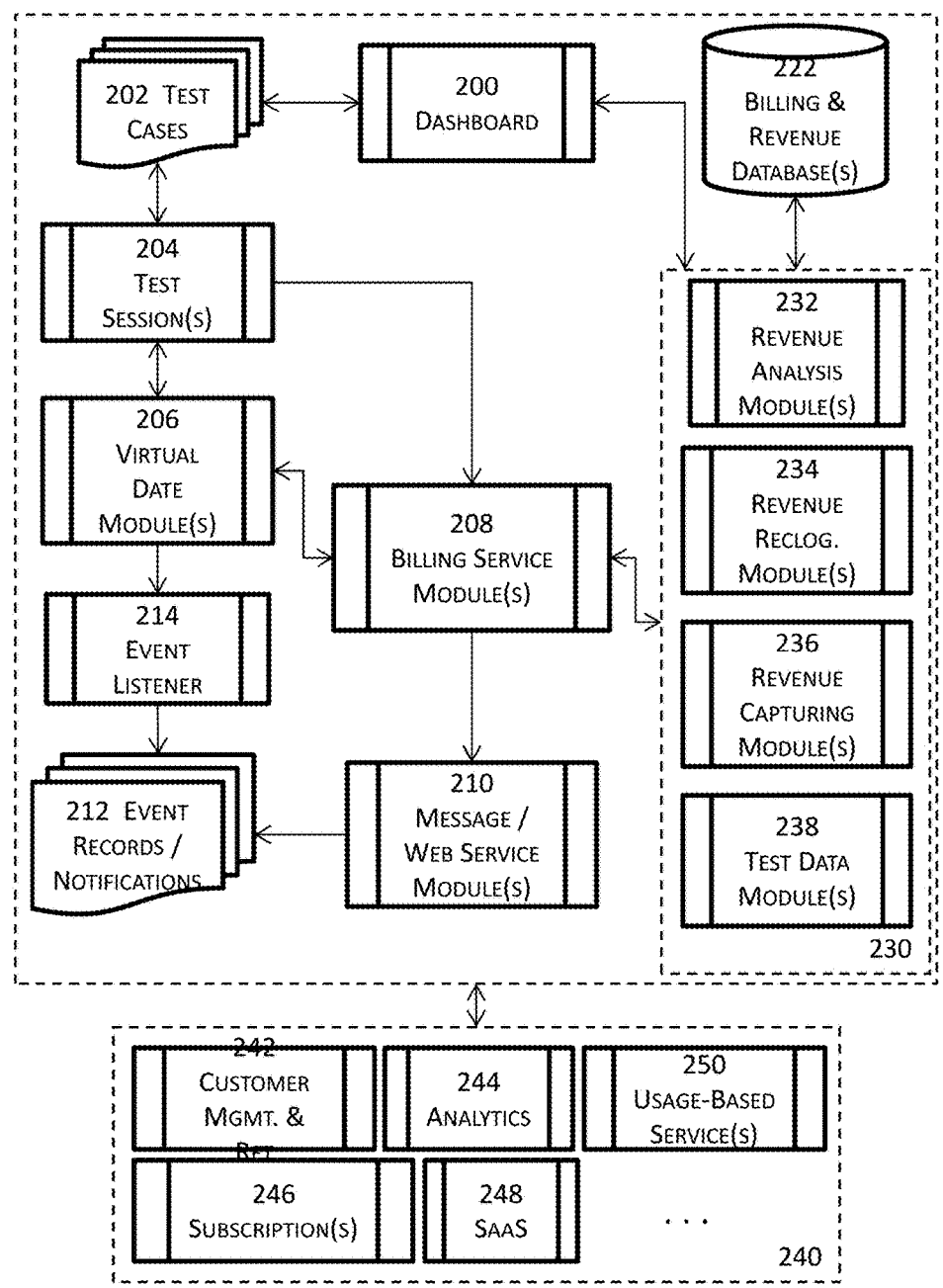
FIG. 2 illustrates a more detailed block diagram of a system for implementing end-to-end automation of software services in one or more embodiments.

FIG. 2 illustrates a more detailed block diagram of a system for implementing end-to-end automation of software services in one or more embodiments. In this example illustrated in FIG. 2, one or more billing service modules 208 are the software system under test with a plurality of test cases 202. The plurality of test cases 202 may be executed concurrently in one or more test sessions 204. A test session may include a semi-permanent interactive information interchange or dialogue, a conversation, or a meeting between two or more processes or modules. A test session may be stateful so that information about the test session is stored by at least one of the two or more processes, modules, or systems. These one or more test sessions 204 may be initiated in one or more test frameworks (not shown) on one or more computing nodes or one or more virtual machines (VM). Each test session may execute one or more test cases provided these one or more test cases share a common environment.

A virtual time or date module 206 may be identified. This virtual time or date module determines the beginning virtual time or date, the end virtual time or date, and one or more temporal periods to adjust the virtual time or date for testing the software system under test. The virtual time or date module may be located on the billing service module 208, on one or more revenue modules, or as a stand-alone module operatively coupled to the billing service module 208, on one or more revenue modules, and the one or more test cases 202 or the one or more test sessions 204. A beginning virtual time or date may be set by the virtual time or date module and broadcast to one or more systems or modules operatively coupled to the virtual time or date module.

A beginning virtual time or date may be the current system time or system date of one of various modules or systems described herein in some embodiments. For example, a beginning virtual time or date may be the current system time or system date of the revenue generation module 234, the revenue capturing module 236, the billing service module 208, etc. A beginning virtual time or date may be provided by or determined based upon one or more test cases. For example, one or more test cases of the plurality of test cases 202 may provide their respective beginning virtual time or date, and one of the one or more virtual times or dates will be selected from the one or more virtual times or dates. As another example, the plurality of test cases may be analyzed to determine the beginning virtual time or date in such a way that all significant events for the plurality of test cases are captured, and no significant events are missed. A significant event includes an event (e.g., a virtual transaction, a virtual user action, a virtual system action, etc.) that affects the behavior or outcome of the software system under test (the billing service module 208 in this example).

Similarly, the end virtual time or date as well as one or more temporal periods used to step from the beginning virtual time or date to the end virtual time or date may also be identified or determined. Once the beginning virtual time or date, the end virtual time or date, and the one or more temporal periods are determined, the beginning virtual time or date may be broadcast to at least the billing service module 208 that may then perform its designated functions or services such as generating virtual event records (e.g., bills or invoices for subscription services 246 of respective subscribers) and notifications 212 in conjunction with one or more message or web service modules 210. These one or more message or web service modules 210 may then forward the virtual event records and notifications 212 to a repository.

These virtual event records and notifications 212 may be stored in the repository that is accessible by the plurality of test cases 202. For example, the one or more test cases may include or operatively coupled to their respective event listener modules 214 that access the repository to determine whether the generated virtual event records include pertinent information for the plurality of test cases, respectively. In some embodiments, specific notifications may be generated and transmitted to the corresponding test cases so that relevant virtual event records may be pulled or pushed from the repository to the respective test cases for the respective test cases to verify or validate the behaviors of the software system under test. In some of these embodiments, the notifications include the links to the corresponding virtual event records for the respective test cases so that the corresponding virtual event records may be retrieved via the provided links.

The billing service modules 208 may also be operatively coupled to the revenue system 230 which may include, for example, revenue capturing modules 236 that capture receipts (e.g., payments for subscription services), revenue recognition modules 234 that recognize various receipts as revenues according to various recognition principles (e.g., the generally accepted account principles or GAAP, international financial reporting standards or IFRS, IAS 18 revenue recognition, etc.), test data modules 238 that performs various tests of the behaviors of the components of the revenue system 230, the revenue analysis modules 232 that analyze various aspects of the revenues. For example, a revenue analysis module 232 may analyze customer churn that is defined as a number of customers who discontinue or cancel a service during a timer period divided by the average total number of customers over the same time period.

The virtual event records (e.g., generated virtual bills or invoices, virtual accounts receivables, virtual payments, etc.) generated by the billing service modules 208 may be forwarded to the revenue system 230 so that various components of the revenue system 230 may perform their respective functions or services on these virtual event records. The outputs of the revenue system 230 may be further transmitted to one or more billing and revenue databases 222 or a copy thereof that may be queried to generate query result sets for these virtual event records. The query result sets may be compiled and displayed in the dashboard 200 for various other purposes such as customer retention management, customer relationship management, etc.

The virtual time or date module may then advance the beginning virtual time or date to the next virtual time or date by incrementing the beginning virtual time or date by a temporal period. Various modules may then repeat their respective functions or services as described above, and this process repeats until a stopping criterion is satisfied for the plurality of test cases. One of the advantages of these techniques described herein is that all of the plurality of test cases may be executed concurrently so that no test case needs to wait for another test case to complete. Various other modules or systems 240 such as a customer management and retention module 242, one or more analytics module 244, one or more subscription systems or modules 246 for one or more subscription services, the SaaA/IaaS/PaaS module 248, one or more use-based services 250, etc. may also be coupled to one or more of the aforementioned modules for customer relationship management, customer retention, analytics, one or more subscription services, software as a service, infrastructure as a service, platform as a service, etc., respectively.

These various modules or systems 240 may collaborate with the other modules or systems illustrated in FIG. 2. For example, multiple modules or systems illustrated in FIG. 2 may be the subject of a plurality of test cases to validate or verify the behaviors of these multiple modules. As a working example, various virtual bills or invoices generated by a billing service module 208 may be utilized in conjunction with one or more test cases for a revenue capturing module 236, a revenue recognition module 234, etc. in the revenue system 230 to verify or validate the behaviors of the revenue system 230.

As another working example, various modules or systems described herein may utilize the results of one or more test cases of one module or system for additional purposes or test cases. As a working example, the analytics module 244 may perform one or more analysis on the results generated by, for example, a billing service module 208 and merge the result into the development of additional test cases for one or more modules or systems (e.g., the customer management module or customer retention module 242). These additional test cases may be used to verify or validate whether these one or more modules or systems respond corrected or as designed to various scenarios generated from the results of the billing service module 208.

Each of these various modules or systems 240 may be an independent subject of the automation techniques described herein in some embodiments. For example, each module or system illustrated in FIG. 2 and described above may be an independent subject of the automation techniques described herein while each module or system is validated or verified with its own set of test cases. In some other embodiments, multiple modules or systems may jointly become an aggregated subject of the automation techniques described herein while these multiple module or systems altogether is validated or verified with a single set of test cases.

It shall be noted that although various figures and paragraphs refer to a subscription based service or a subscription module or system, these techniques described in this application apply with full and equal force to multiple subscription-based services as well as multiple, independent subscription modules or systems. For example, subscription system A providing a first subscription based service and subscription system B providing a second subscription based service may be tested individually and independently from each other with their respective sets of test cases or may be tested together with a combined set of test cases with these described techniques because, as described herein, each test case or test session may invoke its own event listener module 214 that accesses the generated virtual event records and/or notifications 212 to validate or verify their respective modules or systems.

It shall also be noted that although various figures and paragraphs refer to one or more subscription based services or a subscription modules or systems, these techniques described in this application apply with full and equal force to other types of services. For example, the same techniques may also apply to usage based or on-demand services 250 where customers are charged based on their actual usage of one or more services at the same or different per-use charges. Like subscribers, customers of these usage based or on-demand services 250 may also cause identical or substantial similar variability in the scenarios for a billing service module 208 to handle. For example, a user of the usage based or on-demand services 250 may also enjoy some free trial period, may cancel the service anytime although, unlike subscription services, such a cancellation may not incur prorated charges for the user. A user may also voluntarily move among different pricing tiers anytime with different obligations for these on-demand or usage-based services. These described techniques may similarly accommodate such usage-based or on-demand services in identical or substantially similar manners as those described in this application.

Figure 3:
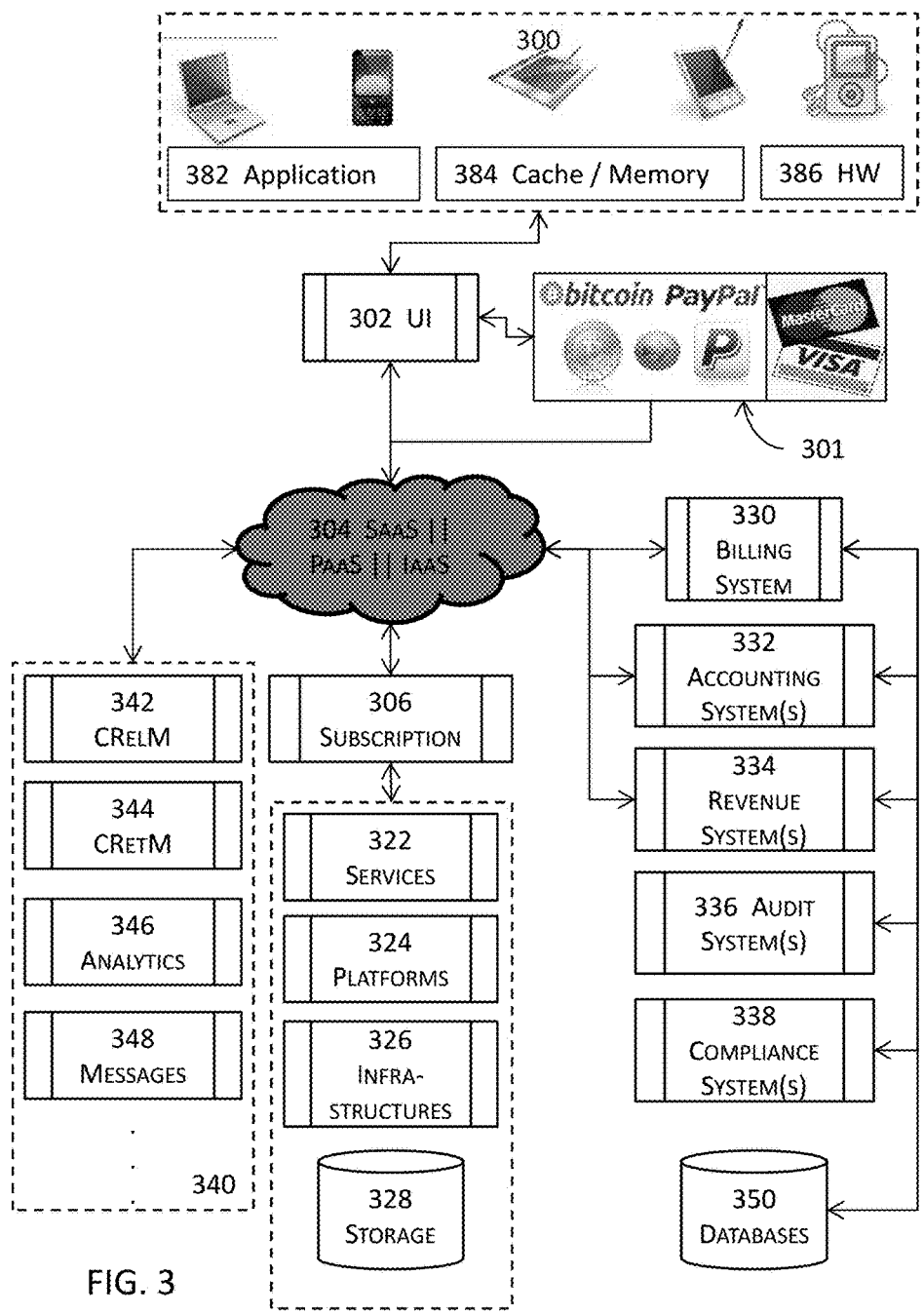
FIG. 3 illustrates more details about the functioning and interactions among various modules described herein as well as between these various modules and various users in one or more embodiments.

FIG. 3 illustrates more details about the functioning and interactions among various modules described herein as well as between these various modules and various users in one or more embodiments. In this example illustrated in FIG. 3, users may interact with various modules described herein with user computing devices 300 that include respective software applications 382, cache and memory 384, various hardware components 386, etc. via respective user interface 302.

For example, users may subscribe or cancel subscription services via the user interfaces 302 provided by the subscription modules or systems 306 of the service modules 304. Users may also render payments either directly to the provider of the service modules 304 or via one or more third party payment gateways 301. These payments may be forwarded to, for example, the accounting system 332, the revenue system 334, etc. for respective accounting and revenue purposes. The subscription services provided by the subscription module 306 may be operatively coupled to or include a plurality of software service modules 322 providing software as a service, one or more platforms 324 providing platforms as a service, one or more infrastructures 326 providing infrastructures as a service, etc. The subscription module 306 may also include or may be coupled to one or more storage devices 328 storing one or more data structures, libraries, etc. supporting the service modules or systems 306.

The service modules 304 may also be operatively coupled to various other systems or modules 340 including, for example, customer relationship management modules 342 providing various functions for managing customer relationships, customer retention management modules 344 providing various data or tools for customer retention, one or more analytics tools 346 analyzing data from various sources to provide analytics, one or more messaging modules 348 providing inter-process and other messaging services, etc. The service modules 304 may also be operatively coupled to the billing system 330 handling billing and invoices, an accounting system 332 processing various accounting tasks pursuant to various accounting principles, and a revenue system 334 for revenue capturing, recognition, and processing of revenues.

One or more of the billing system 330, the accounting system 332, and the revenue system 334 may be further coupled with one or more internal or external compliance systems 338 to ensure compliance with various code, standards, principles, etc. as well as one or more internal audit systems, one or more external audit systems, or a combination of internal and external audit systems (collectively 336) that periodically perform various auditing tasks on the accounting records, revenue records, the billing records, etc. respectively generated by the aforementioned systems. The data records generated by any of the aforementioned systems or modules may be stored in one or more databases 350.

Figure 4A:
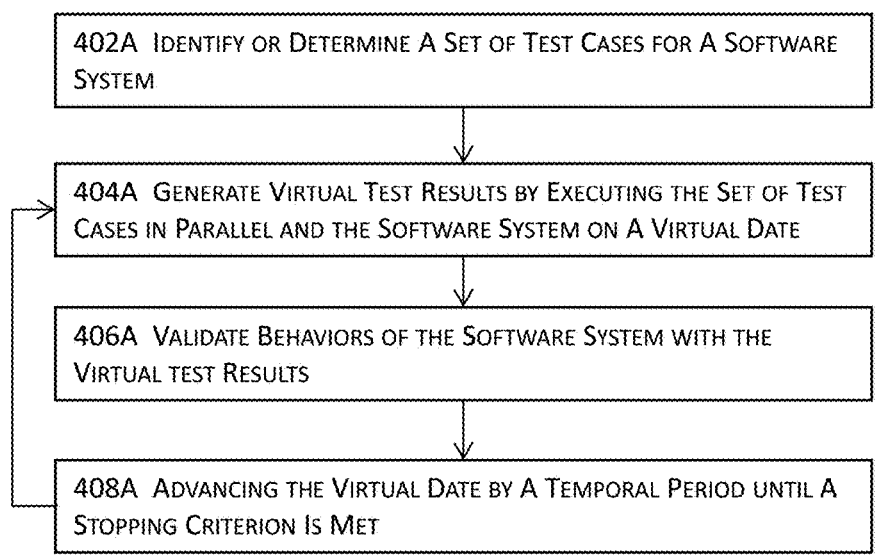
FIG. 4A illustrates a high level block diagram of a method or system for implementing end-to-end automation of software services in one or more embodiments.

FIG. 4A illustrates a high level block diagram of a method or system for implementing end-to-end automation of software services in one or more embodiments. In these embodiments, a set of test cases may be identified from existing test cases or determined anew at 402A for a software system. In some embodiments, the software system provides temporally dependent services whose delivery or licensing models is time dependent. An example of such temporally dependent services includes a subscription service where a subscriber is billed periodically (e.g., monthly, quarterly, annually, etc.) for the services that the subscriber subscribes. An example of a software system under test with the set of test cases may include a billing system that generates bills, invoices, etc. It shall be noted that although many embodiments and examples described herein include a billing module or system and a subscription service, the application of various techniques described herein apply with full and equal effects to other types of modules or systems as well as services.

Virtual test results may be generated at 404A by executing the set of test cases in parallel and the software system on a virtual time or date. For example, a billing system may generate bills or invoices on a first virtual date at 404A for any customers whose billing periods end on the first virtual date. An execution of a test case may include posting one or more significant events or transactions to the software system as instructed or indicated by the test case.

For example, an execution of a test case where a group of subscribers subscribe their respective levels of subscription services on a first virtual date may post the subscriptions to the subscription system and the billing system that automatically generates the bills for the group of subscribers one month from the virtual date when the virtual date is advanced to the one month from the first virtual date. The functional and/or non-functional behaviors of the software system may be validated or verified at 406A with the virtual test results.

With or without waiting for the completion of the validation or verification of the behaviors of the software system at 406A, the virtual time or date may then be advanced at 408A by a temporal period until a stopping criterion is satisfied. The process then returns to 404A to continue the execution of the set of test cases and the software system as described above. The virtual time or date may be advanced after receiving an indication of the completion of verification or validation in some embodiments where conservation of computational resources is set to a higher priority than the expediency of the completion of the set of test cases.

For example, if verification or validation of the behaviors of the software system reveals a critical issue that may cause negative impacts on the correctness of the behaviors of the software system in some corner cases, continuing the execution of the software system by advancing the virtual date to one or more next virtual dates may consume and thus waste more computational resources due to the critical issue. In this example, advancing the virtual time or date may be instructed to wait for the completion of verification or validation if computational resource conservation is assigned a higher priority. On the other hand, if the expediency of completing the set of test cases is set to a higher priority, a virtual time or date module may advance a virtual time or date as soon as the execution of the software system is complete, without waiting for the verification or validation to finish.

As an illustrative example, a first test case may involve a first subscriber who subscribes a first level of software services on a first date of a month for a one-week free trial period, upgrades to a second level of software services on a second date beyond the one-week free trial period in the same month, and cancels the subscription on a third date of the month. A virtual time or date module may set the beginning virtual time or date to be the first date, and the first test case (together with one or more other test cases in parallel) as well as the billing system then execute on the beginning virtual time or date (the first date). More specifically, the first test case posts the significant event—subscription by the first subscriber on the first date with one-week free trial—to the billing system that records the beginning of the subscription service for the first user albeit at a prorated rate of charge of zero (0) on the first seven days.

The virtual time or date module may then advance the current virtual date (the first date) by a time period (e.g., one day, several days, etc.) The virtual time or date may be advanced by any temporal period at a time, and the temporal period for each adjustment needs not be the same. For example, the virtual time or date may be advanced by a number of hours, one day, or several days at a time. Nonetheless, advancing the virtual time or date is performed in such a way that no significant events are missed.

For the ease of explanation, assuming the virtual date is advanced to the eighth day on which the first subscriber begins to be charged for the first level of subscription service, this significant event may be provided to the billing system. The virtual date may be further advanced to the second date when the first subscriber upgrades to a second level at a higher price level. The execution of the first test case posts this significant event—upgrade to a higher priced subscription level—to the billing system which may then reset the prorated charge basis for the first subscriber starting from the second date.

The virtual date may again be advanced to the third date (with zero or more intervening virtual dates) when the first subscriber cancels the subscription service. The execution of the first test case posts this significant event—cancelling the subscription service—to the billing system which may then set the last day of the charge to the third date. The virtual date may then be further advanced to one month from the first date where the bill is to be generated for the first subscriber for the monthly-billed subscription service.

The billing service may then generate the prorated bill for the first subscriber, and the first bill may then be validated by the first test case or another module to determine whether the billing system correctly generate the bill to reflect the one-week free trial, the lower prorated charge rate between the eighth day from the first date and the second date, the higher prorated charge rate between the second date and the second date, and cancellation and thus no charge beyond the third date in the same month.

Figure 4B:
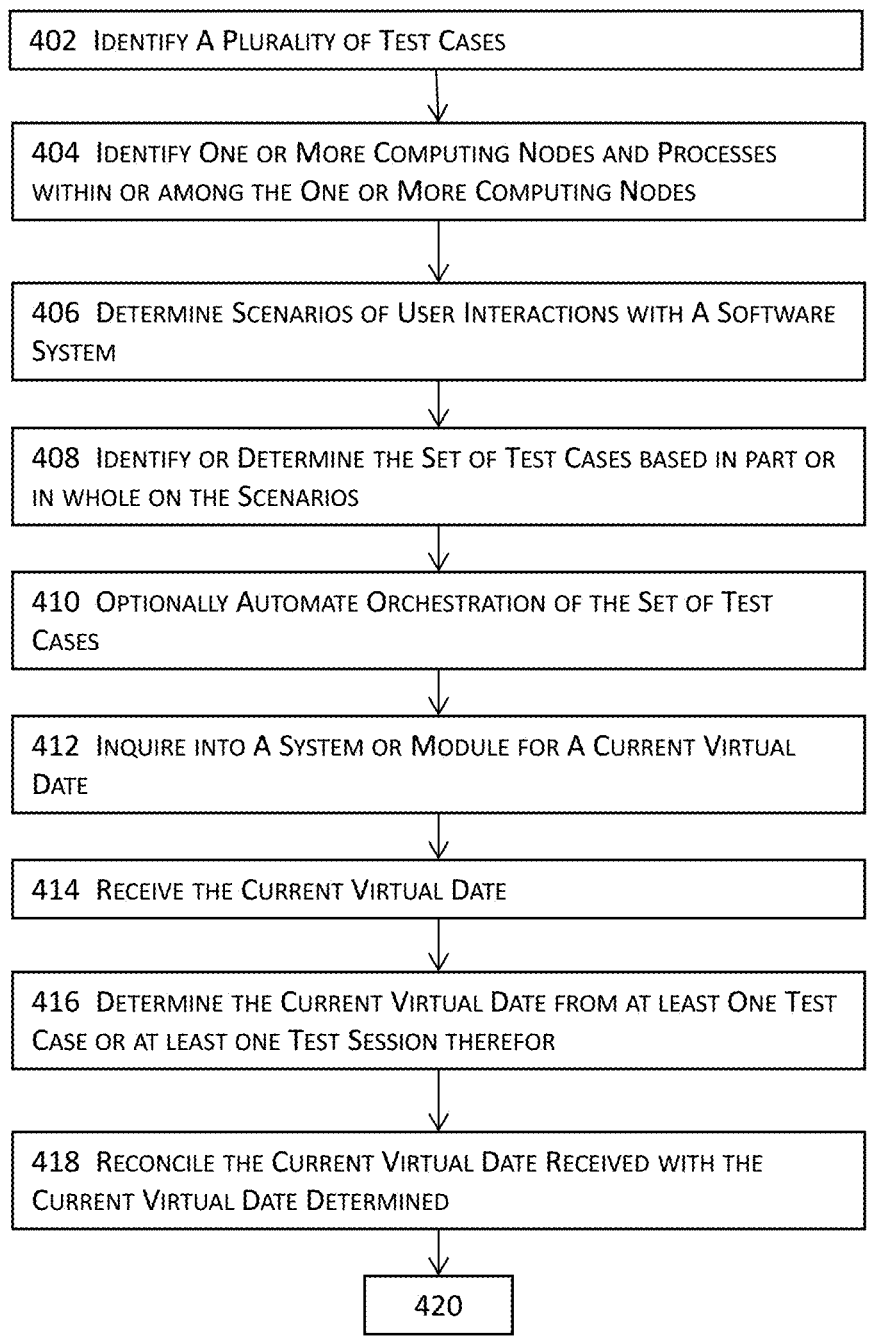
FIGS. 4B-D jointly illustrate a more detailed block diagram of a method or system for implementing end-to-end automation of software services in one or more embodiments.
Figure 4C:
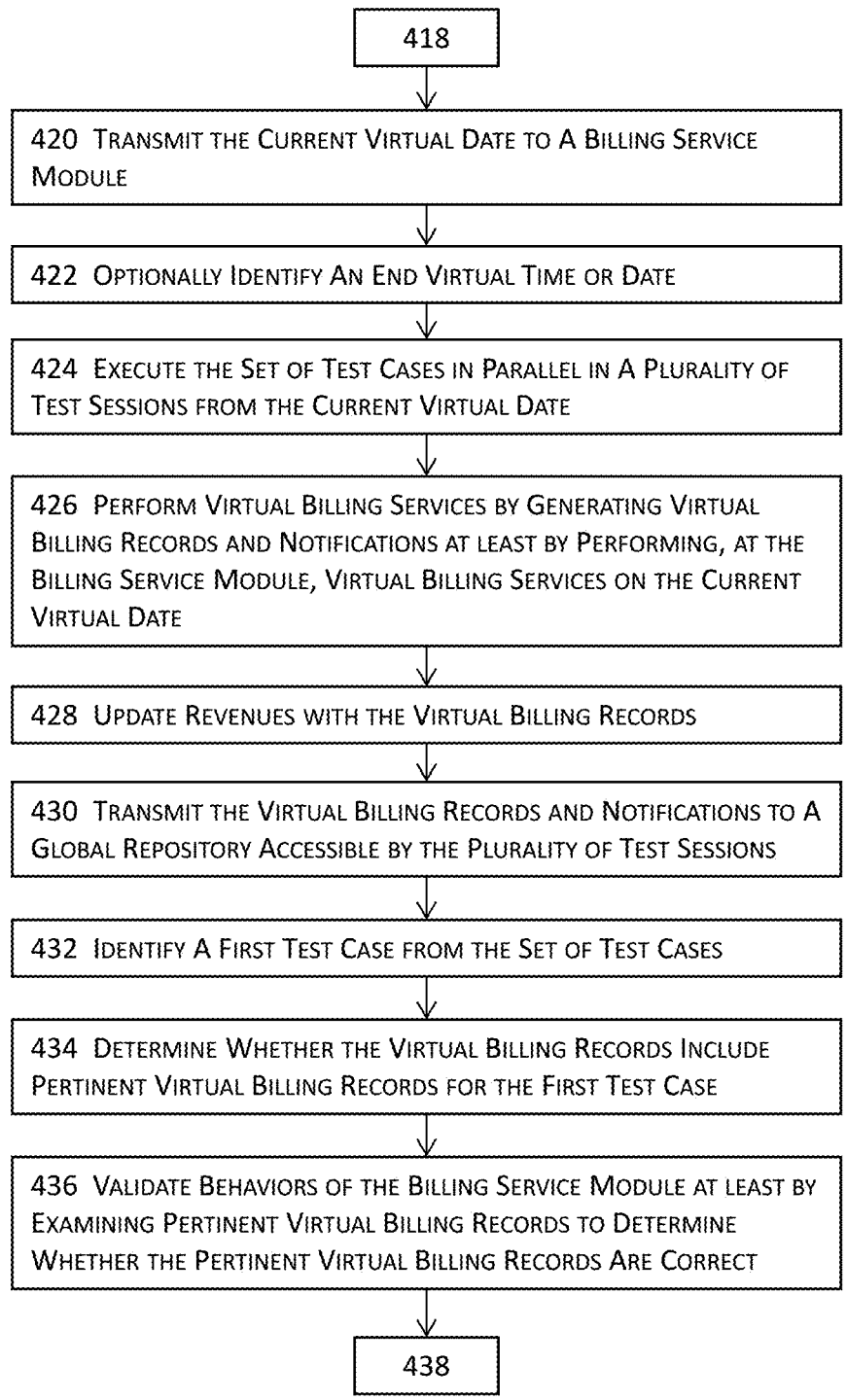
Figure 4D:
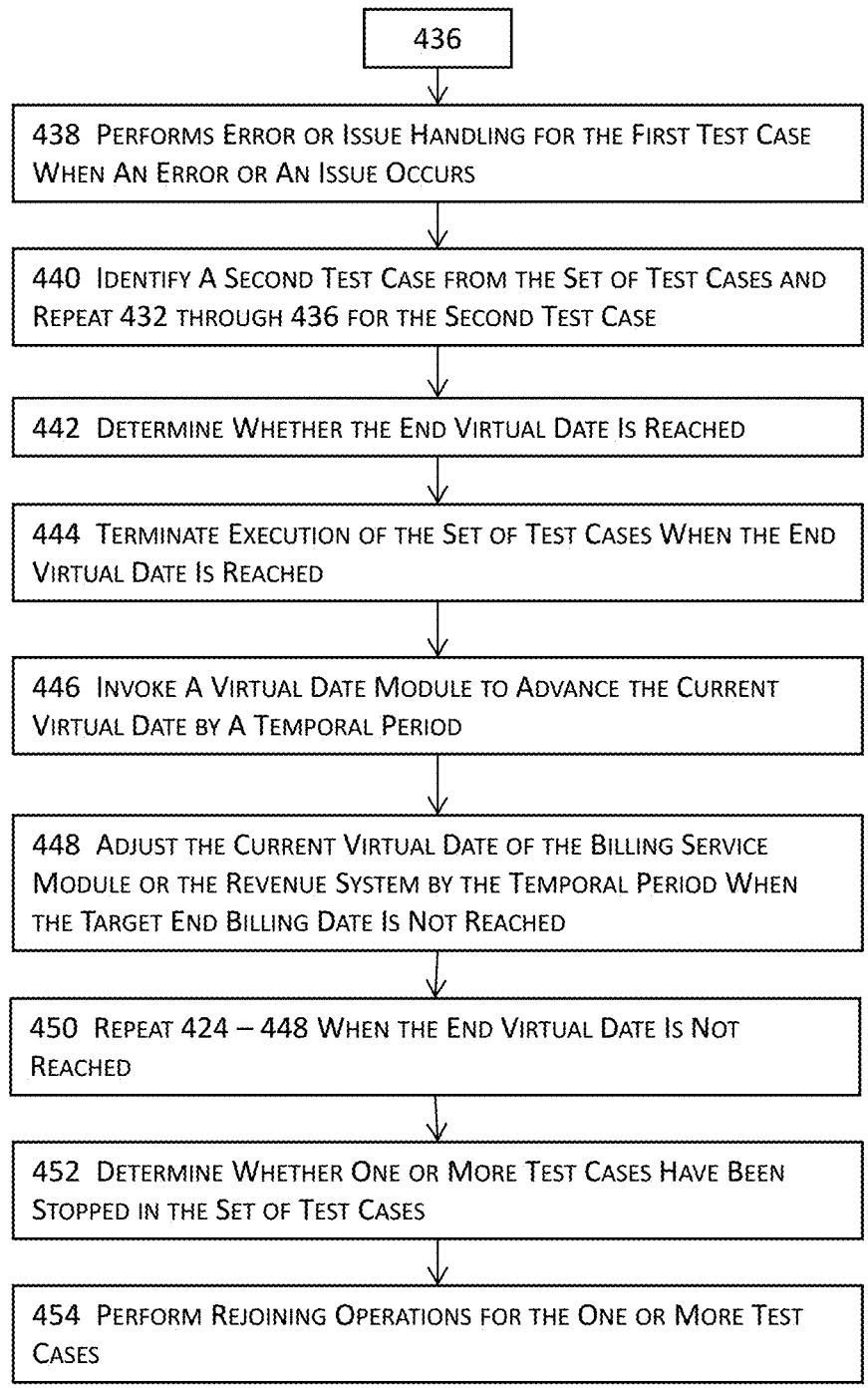

FIGS. 4B-D jointly illustrate a more detailed block diagram of a method or system for implementing end-to-end automation of software services in one or more embodiments. In these embodiments, a plurality of test cases may be identified from at 402 from a repository. These test cases may include test cases that are generated for other software systems but may be reused with or without modification or customization. Although test cases are usually designed specifically to fit a particular software system under test, some aspects of software systems may nevertheless resemble each other, and test cases for these aspects may thus be reused with no or just limited modifications or customizations. This is especially true for some non-functional features or even some functional aspects of software systems. Therefore, identifying some existing test cases that may be reused may further reduce the development time as well as the possibility of errors during test case development.

One or more computing nodes and a plurality of processes within or among the one or more computing nodes may be identified at 404. As described herein, the set of test cases may be executed concurrently or in parallel as multiple parallel sessions (e.g., as parallel executing processes or virtual machines) on a single computing node or a plurality of computing nodes. Scenarios of user interactions with the software system may be determined at 406. These user interactions may be context sensitive and depend on the type of the software system under test. In some embodiments, only the user interactions that may be significant for the functions or services of the software system may be identified at 406. A user's subscription, upgrade, and cancellation of a service affect a billing system's calculation of the charge amount for the user and may thus be identified at 406 when the billing system is the software system under test. A set of test cases for the software system may be identified or determined at 408 from the plurality of test cases based in part or in whole on the scenarios determined at 406.

At 410, orchestration of the set of test cases may be optionally automated. Orchestration of the set of test cases may include, for example, grouping the set of test cases into one or more groups each of which shares some common or substantially attributes (e.g., having identical or similar dates on which significant events occur, testing identical or similar aspects of the software system under test, etc.) Orchestration of the set of test cases may also include coordination of the execution of the set of test cases, management of the execution of the set of test cases and their respective results, alignment of middleware and services therefor, deployment of infrastructures, environments, software components, artifacts, policies, workflows, resources, etc. for the set of test cases, or any other suitable elements for the parallel execution of the set of test cases.

Typically, orchestration of test cases is performed by human administrators, yet these techniques described herein may orchestrate test cases without or with just minimal or reduced level of human intervention. An inquiry about the current virtual time or date may be sent to a module or system to obtain the current virtual date at 412. This module or system may include, for example, a billing service module, a revenue system, or a stand-alone virtual time or date module operatively coupled to the set of test cases and various other modules and systems integrated to facilitate the parallel execution of the set of test cases.

The current virtual time or date may be received at 414 from the system or module inquired into at 412. The current virtual time or date represents when the plurality of test cases start execution and may be a time or date in the future in some embodiments or may be the system time or system date of one or more modules or systems (e.g., the virtual time or date module, the revenue system, the billing service module, etc.) A virtual time or date in these embodiments represents one of a set of discrete times or dates that are set by the virtual time or date module and represent when one or more significant events occur and/or when the software system under test (e.g., the billing service module) performs its designated functions or services (e.g., generating bills or invoices). In some embodiments, the current virtual date may be received or determined at 416 by examining the set of test cases and identifying the earliest date on which one or more significant events occur so that no significant events are missed during the execution of the plurality of test cases and that of the software system under test.

The current virtual time or date received at 414 may be reconciled at 418 with the current virtual time or date determined at 416. The purpose of this reconciliation is to ensure that the selection of the current virtual time or date does to miss any significant events for the testing of the software system with the plurality of test cases. In some embodiments where the computational cost may be sufficiently high to select the current virtual time or date different from the system time or date, the system time or date may be selected during the reconciliation at 418 to reduce the computational cost. For example, certain revenue systems or billing service modules may not necessarily support changing the current system time or date to a different, virtual time or date without substantial modifications or cost (e.g., creating a virtual copy on a virtual machine). In this example, the current system time or date may be selected during the reconciliation at 418.

The current virtual time or date may be broadcast to one or more modules or systems at 420. For example, the current virtual time or date may be transmitted to one or more test sessions of the plurality of test cases as well as the billing service module at 420. An end virtual time or date may be optionally identified at 422 to ensure that executions of various software components, modules, and systems do not continue forever. The set of test cases may then be executed in parallel at 424 in one or more test sessions on one or more computing nodes. Virtual services (e.g., virtual billing services) may be performed at 426 by generating virtual event records (e.g., virtual bills and invoices) and notifications on the current virtual time or date.

For example, a billing service module may perform virtual billing services to generate virtual bills or invoices and notifications on the current virtual time or date. One or more other records may be virtually updated into updated records stored on a temporary storage (e.g., memory) with the virtual records. For example, the revenue records may be updated at 428 into virtual updated revenue records with the virtual bills, virtual invoices, virtual payments received, etc. at 428. The virtual records may be transmitted at 430 together with the notifications to a repository that is accessible by the set of test cases or by one or more listener modules for the set of test cases. The set of test cases may be separately notified with corresponding notifications, or the one or more listener modules of the set of test cases may inquire into the repository to determine whether there are pertinent virtual records on the current virtual date.

A first test case may be identified at 432 from the set of test cases, and a determination may be made at 434 to decide whether the virtual records include pertinent virtual records for the first test case. If the determination is affirmative, functional and/or non-functional behaviors of the software system under test may be validated or verified at 436 at least by examining the pertinent virtual records to determine whether the software system behaves correctly.

Error or issue handling may be performed at 438 for the first case when an error or an issue (e.g., a system issue, an environment issue, etc.) occurs as evidenced in the pertinent virtual records for the first test case. The same may be performed for each test case in the set of test cases. More specifically, one or more remaining test cases may be further identified at 440, and the processes 432 through 436 may be repeated until all test cases in the set are identically or similarly processed. It shall be noted that on the current virtual date or on any other virtual date, there may be no virtual records to be generated by the software system for any verification or validation simply because no billing periods end on this current virtual date. Also, even when some billing periods end on a particular virtual date, this does not mean that all test cases executed in parallel necessarily have pertinent virtual event records for validation or verification.

For example, a first test case may have pertinent virtual billing records on a first virtual date but not on a second virtual date, and a second test case may have pertinent virtual billing records on the second virtual date but not on the first virtual date. These techniques described here may use the notifications to engage the test cases corresponding to the generated virtual event records on a virtual date while the remaining test cases corresponding to no virtual event records may be instructed to skip the verification or validation to conserve computational resources of initiating the verification or validation code modules.

A determination may be made at 442 to determine whether the end virtual date has been reached. If so, the virtual time or date module will not advance the current virtual date and repeat the execution of various modules or systems as described above. The execution of the set of test cases may then be terminated normally at 444. Otherwise, the virtual time or date module may be invoked at 446 to advance the current virtual date by a temporal period. A temporal period may be determined based in part or in whole upon one or more criteria. One of the criteria may include computation resource conservation and expediency of test case execution.

For example, a temporal period may be determined to be the maximum amount of time during which no significant events in the set of test cases will be missed if the entire temporal period is skipped (e.g., no virtual time or date is set within this temporal period). By using this maximum amount of time to advance virtual time or virtual date, the virtual time or date will be set outside of this temporal period while no significant events will be missed to affect the coverage or accuracy of the results of the set of test cases. The current virtual date of one or more systems or modules (e.g., the billing service module) may be adjusted at 448 by the temporal period when it is determined that the end virtual time or date has not been reached.

The processes from 424 through 448 may then be repeated at 450 for each new virtual time or date until the end virtual time or date has been reached. On each virtual date or at each virtual time, a determination may be made at 452 to determine whether one or more test cases in the set of test cases have been stopped or paused. A test case may be stopped or paused, and a state may be saved for possible subsequent resume due to, for example, the occurrence of an error or an issue (e.g., a system issue, an environment issue, etc.) during the execution of the test case. These one or more stopped or paused test cases may be rejoined, if possible, by some rejoining operations at 454. More details about the rejoining operations will be described below with reference to FIGS. 6A-C.

Figure 5:
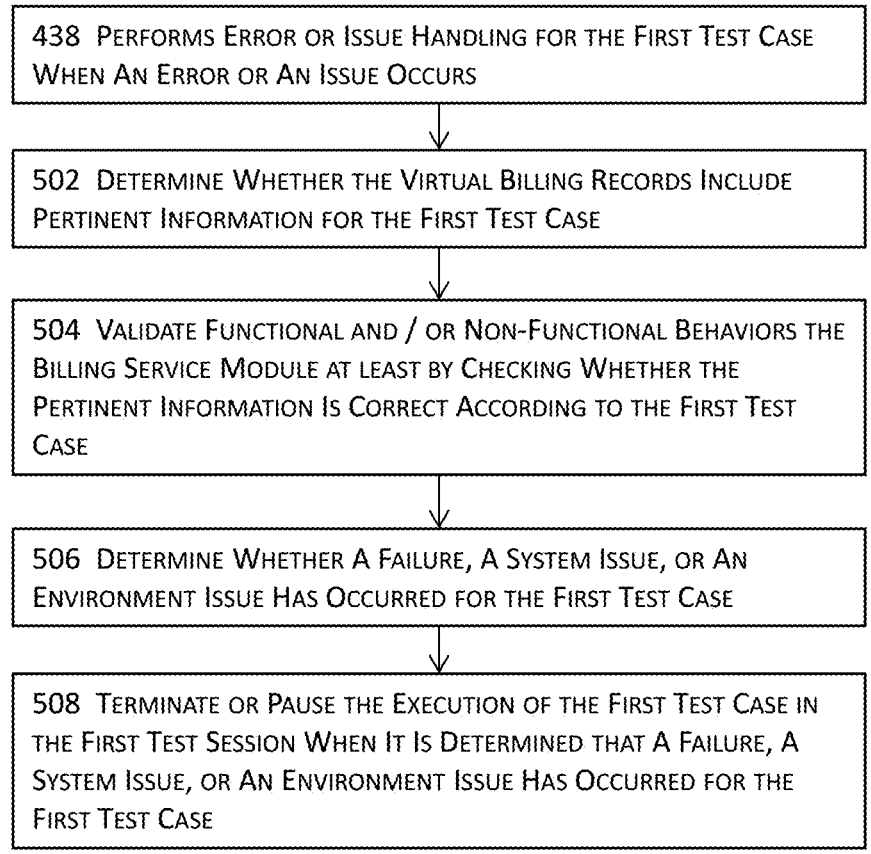
FIG. 5 illustrates more details about a process in FIGS. 4B-D for implementing end-to-end automation of software services in one or more embodiments.

FIG. 5 illustrates more details about a process in FIGS. 4B-D for implementing end-to-end automation of software services in one or more embodiments. More specifically, FIG. 5 illustrates more details about error or issue handling for the first test case of FIGS. 4A-D. In these embodiments, a determination may be made at 502 to decide whether the virtual event records include pertinent information for the first test case. Pertinent virtual event records may be available at a virtual time or on a virtual date when the first test case is executing. Pertinent virtual event records may also be available on the current virtual time or date when, for example, some billing periods from previously posted subscriptions end on the current virtual date while the first test case was stopped or paused on a previous virtual date.

In this example, it is determined that there are pertinent virtual event records for the first test case on at least the current virtual time or date. In addition to the pertinent virtual event records, another determination may also be made to decide whether there are any significant events in the first test case between the previous virtual time or date when the first test case was stopped or paused and the current virtual time or date when the first test case is rejoining the set of test cases. If so, these significant events will be reposted, and one or more other related systems or modules will be made aware of these significant events for the first test case.

Functional and/or non-functional behaviors of the software system under test may be validated or verified at 504 at least by examining the pertinent virtual event records for the first test case to determine whether the software system under test behaves correctly in view of the pertinent virtual event records. Another determination may be made at 506 to decide whether a failure or an issue has occurred during the verification or validation of the software system under test with the first case and the pertinent event records.

For example, an error may have occurred with the first test case or the software system in such a way that renders the first case or the previously generated pertinent virtual event records erroneous. In this example, the first case may not be allowed to rejoin and may be terminated at 508. On the other hand, if it is determined that such an error or issue has occurred, the error or the issue (e.g., a system issue, an environment issue, etc.) may be minor and easy to fix by modifications that have no or minimal impacts on the first test case, one or more related modules or systems, and/or one or more other test cases. In this latter case, the first case may be paused at 508 to undergo such modifications and may be allowed to subsequently rejoin after the modifications. More details about rejoining a stopped or paused test case are described below with reference to FIGS. 6A-C.

Figure 6A:
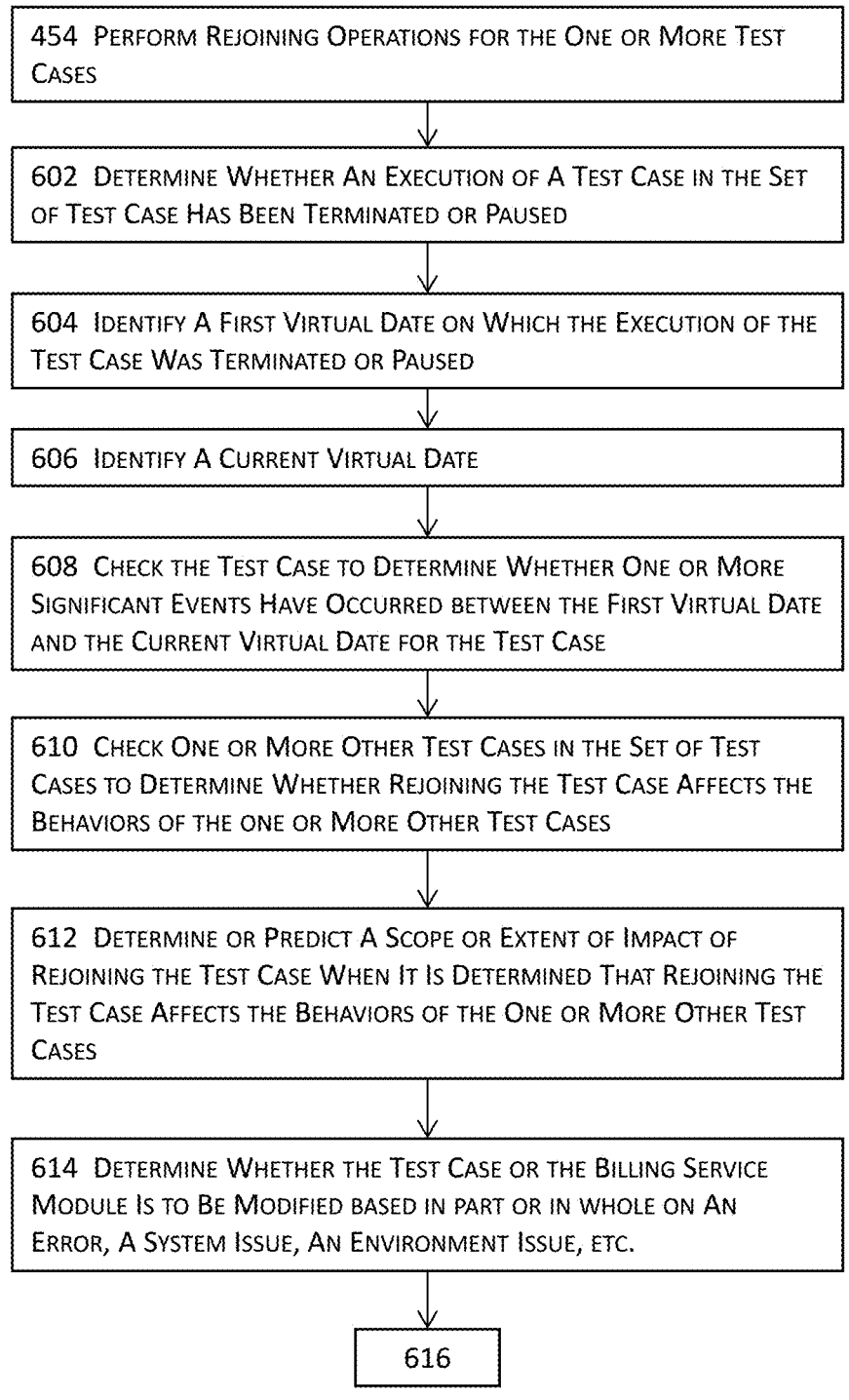
FIGS. 6A-C jointly illustrate more details about another process in FIGS. 4B-D for implementing end-to-end automation of software services in one or more embodiments.
Figure 6B:
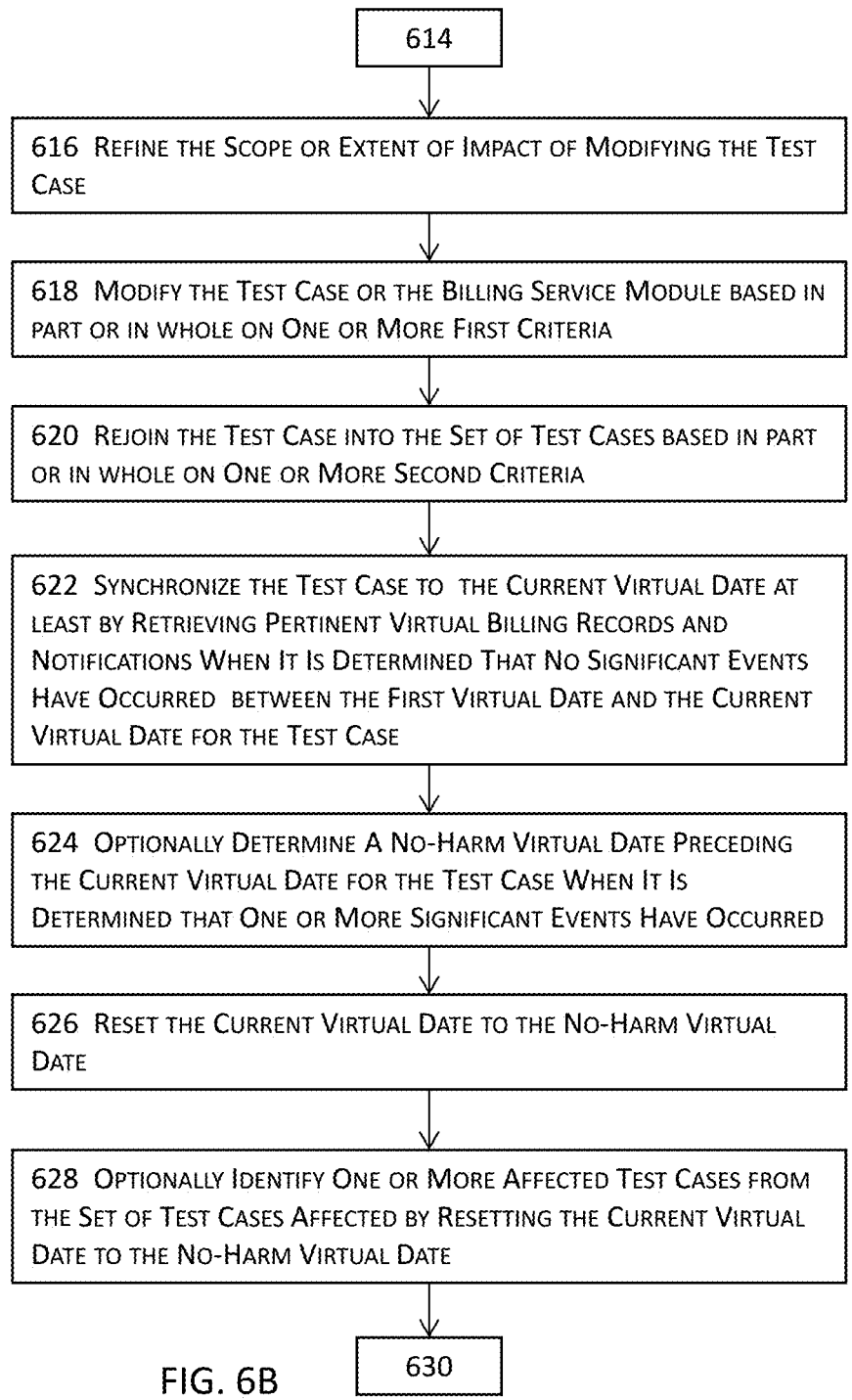
Figure 6C:
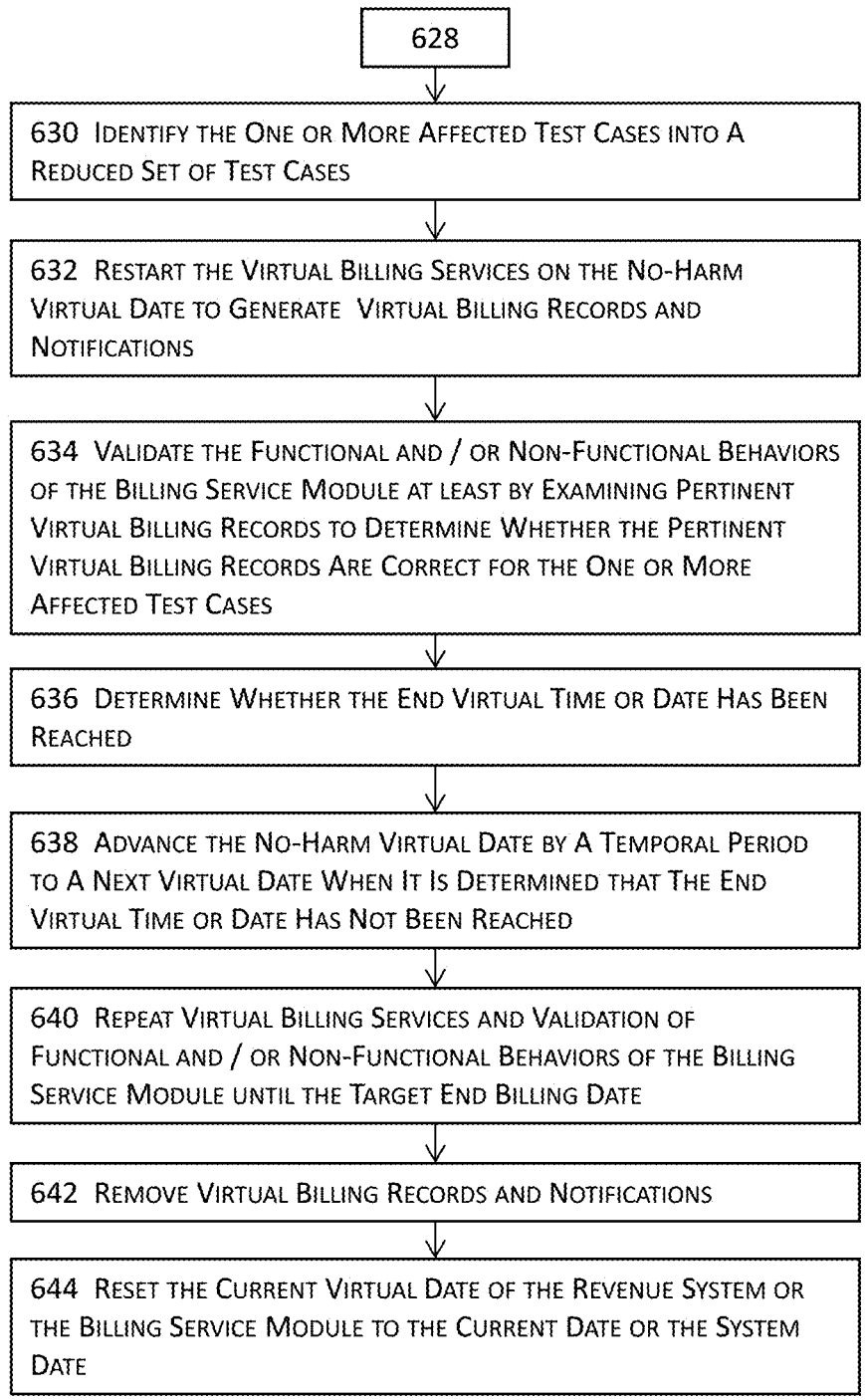

FIGS. 6A-C jointly illustrate more details about another process in FIGS. 4B-D for implementing end-to-end automation of software services in one or more embodiments. In these embodiments, a determination may be made at 602 to decide whether an execution of a test case in the set of test cases has been terminated or paused. If so, a first virtual time or date at or on which the execution of the first test case was terminated or paused may be identified at 604. The current virtual time or date may be identified at 606; and the test case that has been terminated or paused may be checked at 608 to determine whether one or more significant events have occurred between the first virtual time or date at or on which the first test case was terminated or paused and the current virtual date. For example, the test case may be parsed to determine whether any subscribers subscribed the subscription services, whether any subscribers canceled their subscription services, whether any subscribers changed (either increase or decrease) their current levels of subscription services, etc. between these two virtual times or dates.

One or more other test cases may also be checked at 610 to determine whether rejoining the test case into the set of test cases affects the behaviors of these one or more other test cases. For example, the issue or error that caused the test case to be terminated or paused may require a change in the behavior of the billing service module. If the change affects the test results for the one or more other test cases, the test case is determined to affect the one or more other test cases at 610. On the other hand, if the change does not alter the results of the one or more other test cases, the test case is determined not to affect the one or more other test cases.

The scope or extent of the impact of rejoining the test case into the set of test cases may be determined or predicted at 612 based in part or in whole upon whether and how rejoining the test case affects the remaining test cases in the set of test cases. In addition, whether the test case or one or more modules or systems (e.g., the billing service module) are be modified may be determined at 614 based in part or in whole upon the error or the issue that resulted in the termination or pause of the test case. The modification is to resolve the error or issue that caused the test case to be terminated or paused and may require a change to the test case, one or more modules or systems, or both the test case and the one or more modules or systems.

The scope or extent of the impact of rejoining the test case into the set of test cases determined at 612 may be refined at 616 based in part or in whole upon modifying the test case and/or one or more modules or systems before actually implementing the modifications. The test case and/or the one or more modules or systems may be modified at 618 based in part or in whole upon one or more first criteria. These one or more first criteria may include, for example, how many other entities (e.g., test cases, modules, systems, etc.) will also have to be modified as a result of the modifications to the test case and/or the one or more modules or systems to resolve the error or issue. For example, these techniques may identify the total number of test cases whose bills or invoices will have to be regenerated as a result of modifying a part of the billing service module.

The extent or scope of impact may be determined based on the number of test cases and resources required to modify the part of the billing service module. As another example, if resolving the error or issue results in only some modifications to the test case itself without affecting the behaviors of the billing service module or the other test cases, these modifications may be determined to have a minimal or no extent of impact. Once the test case or the one or more modules or systems have been modified at 618, the test case may be rejoined at 620 into the set of test cases based in part or in whole on one or more second criteria. These one or more second criteria may include, for example, whether there is any significant events between from the first virtual time or date and the current virtual time or date as a result of rejoining the test case, the number of significant events as a result of rejoining the test case, whether one or more significant events resulting from rejoining the test case affects one or more other test cases, etc.

Once rejoined, the test case may be synchronized at 622 to the current virtual time or date at or on which the latest execution occurs when it is determined that no significant events or only harmless significant events have occurred between the first virtual time or date and the current virtual time or date. Synchronizing the test case may be achieved at least by retrieving pertinent virtual event records and notifications for the first test case and update the data in the test session accordingly. Synchronizing the test case may also be achieved at least by posting the harmless significant events, if any, to one or more systems or modules (e.g., the billing service module, the subscription system, etc.)

A harmless significant event includes a significant event that affects only the test case but exhibit no or minimal impact that change the results of the other test cases. A no-harm virtual time or date between the first virtual time or date and the current virtual time or date may be optionally determined at 624 when it is determined that one or more significant events have occurred during this period of time, and that these one or more significant events are not harmless significant events posted by the test case for the other test cases. For example, if the test case was terminated or paused on July 8, and rejoining the test case on July 12 (the current virtual date) reposts two significant events that affect at least one other test case. If these two significant events occurred on July 10, and there is either no significant event or only harmless significant events after July 10 in rejoining the test case, the harmless virtual time or date may be determined to be July 11.

With the harmless virtual time or date, although rejoining the test case into the set of test cases results in the re-execution of the affected test cases between the first virtual time or date and the harmless virtual time or date, the scope and extent of re-execution is reduced to the minimum when compared to re-execution of the affected test cases between the first virtual time or date, at or on which the test case was terminated or paused, and the current virtual time or date. Therefore, the determination of a harmless virtual time or date may actually conserve computational resources in terms of memory footprint (less data to load into the memory) and runtime (less data to process and generate).

The current virtual time or date may be reset to the first virtual time or date and the harmless virtual time or date, if available, at 626. One or more affected test cases that are impacted by rejoining the test case may be identified at 628 from the set of test cases. The one or more affected test cases may be identified at 630 into a reduced set of test cases. The rejoined test case and the one or more affected test cases that are impacted by the rejoining of the test case may be re-executed between the first virtual time or date and the harmless virtual time or date, and only the test case may be further re-executed between the harmless virtual time or date and the current virtual time or date, while these one or more affected test cases are not due to the absence of any significant events introduced by rejoining the test case that may affect these one or more affected test cases. The generation of the reduced set of test cases also conserves computational resources because re-execution is limited to the reduced set of test cases, instead of the original set of test cases.

The virtual billing services may be restarted or re-executed at 632 on the no-harm virtual time or date to generate the virtual event records and notifications for the rejoined test case. The regenerated virtual event records may be used to validate or verify the functional or non-functional behaviors of the billing service module at 634 at least by examining the pertinent virtual event records (e.g., bills, invoices, etc.) to determine whether the billing service module behaves correctly.

A determination may be made to decide whether the end virtual time or date has been reached at 636. The no-harm virtual time or date may be advanced at 638 by a temporal period to a next virtual time or date when it is determined that the end virtual time or date has not been reached or when the stopping criterion has not been satisfied. The virtual billing services, execution of the set of test cases, validation or verification, and advancement of the current virtual time or date to the next may be repeated at 640 until the end virtual time or date has been reached or the stopping criterion has been satisfied.

Once the validation or verification by the set of test cases has been completed, the virtual event records, the notifications, and other temporary data may be removed at 642 so that the integrity of the original data will not be affected. The current virtual time or date of one or more modules or systems may also be reset at 644 to the current system time or system date.

Figure 7:
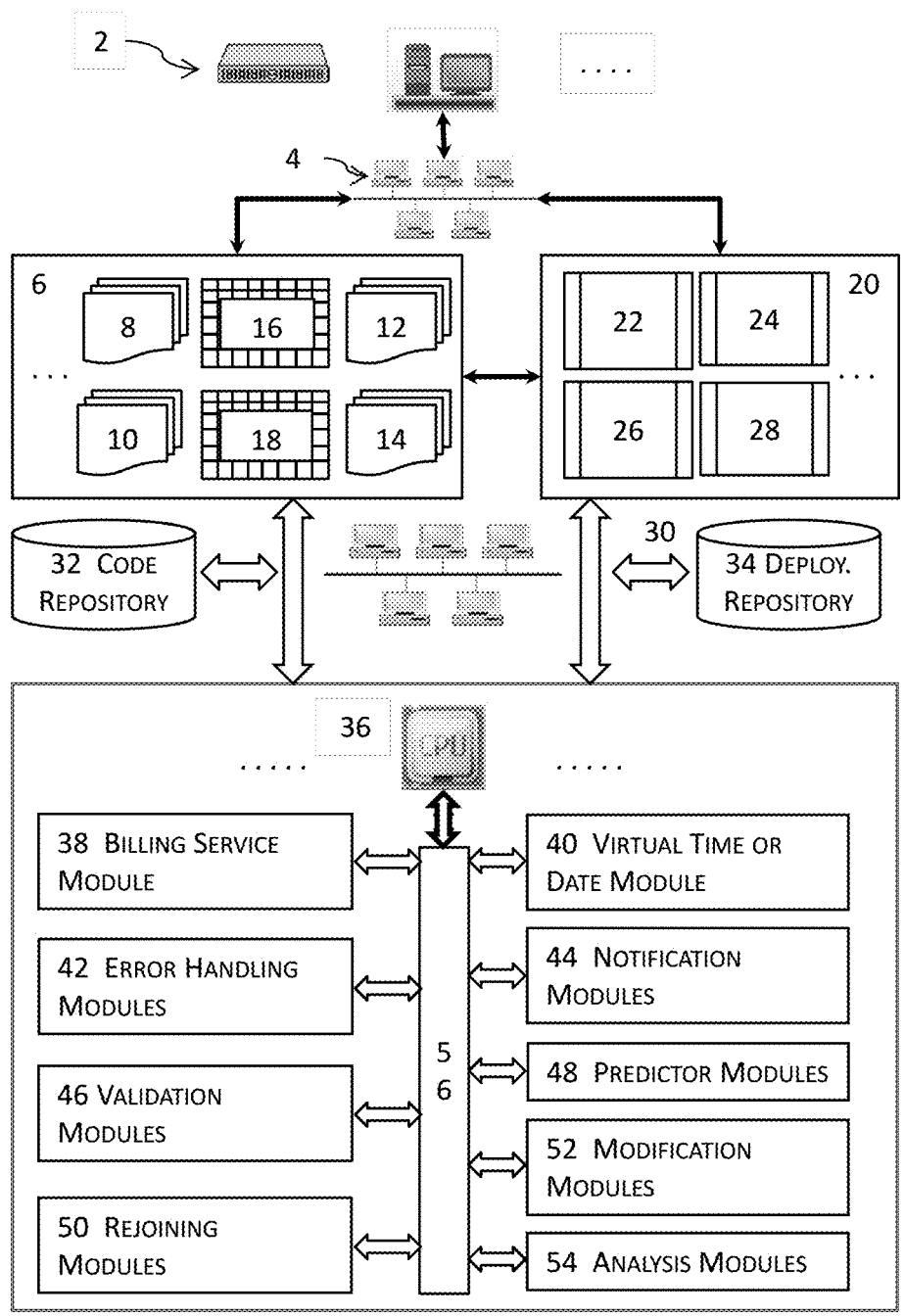
FIG. 7 illustrates a high level block diagram for a system for implementing end-to-end automation of software services in one or more embodiments.

FIG. 7 illustrates a high level block diagram for a system for implementing end-to-end automation of software services in one or more embodiments. More specifically, FIG. 7 illustrates a computing platform including a plurality of computing systems (2) such as desktops, laptops, work stations, terminals, servers, etc. The plurality of computing systems (2) are communicatively connected to one another via the network (4). The plurality of computing systems may each perform read and/or write access to a set of data or information (6) that may further include, for example, a plurality of test cases (8), a plurality of virtual events and virtual event records (10), a plurality of libraries (12), a plurality of procedures (14), or any other desired or required data or information. The set of data or information (6) may further include one or more billing databases (16) and one or more revenue and accounting databases (18) as well as their schemas and scripts.

The set of data or information (6) may be entirely installed on a computing system or may be entirely hosted on the one or more servers while the other computing systems utilize the network 6 to access the set of data or information (6). The plurality of computing systems (2) may be communicatively connected to application software or software services (e.g., software as a service or SaaS) (20) that may further include, for example but not limited to, a tax return preparation application software or software service (22), an accounting application software or software service (24), a finance application software or software service (26), an enterprise application software (28), etc.

An application software or software service described herein includes a computer program that is configured or designed to perform specific tasks (e.g., word processing, accounting, financial management, tax return preparation, etc.) beyond the basic or general operations of computers in some embodiments. An application software or software service may be modularized or non-modularized and is distinguishable from operating systems, utilities, or software systems such as search engines. A utility is a program designed to perform a particular function for compute system management and is not an application software or software service. An operating system is system software that manages hardware and software resources of a computer and provides common services for computer programs and is not an application software or software service. These application software or software services may constitute the targets for the application of various techniques described herein.

The plurality of computing systems (2) may access a test case repository (32) including a plurality of test cases and test case templates and a temporary data repository (34) storing various temporary data (e.g., virtual billing records, virtual revenues, virtual accounting records, etc.) through network (30) that may be identical to or different from the network (4) described above. In addition, the plurality of computing systems (2) may further access a set of modules that may execute in a parallel computing paradigm or a distributed computing paradigm to perform respective functions provided by the set of modules (36).

For example, the set of modules may include a billing service module (38) that performs billing services to generate bills, invoices, etc., a virtual time or date module (40) that manages virtual time and virtual date, and an error or issue handling module (42) that performs error or issue handling as described above. In addition, the set of modules (36) may also include a notification module (44) that generates and delivers notifications to a repository or to specific recipients (e.g., a test session, a test case, etc.), a validation or verification module (46) that verifies or validates the behaviors of one or more modules or systems under test, and a predictor module (48) that predicts or estimates, for example, the extent or scope of impact of rejoining a terminated or paused test case.

The set of modules (36) may also include a modification module (52) that modifies test cases or one or more modules or systems to resolve errors or issues revealed by the verification or validation. A rejoining module (50) may also be included in the set of modules (36) to determine whether a test case may join or rejoin a currently executing set of test cases based on various analysis results performed by the rejoining module alone or in conjunction with one or more other modules (e.g., the analysis module 54). In addition, the set of modules (36) may include one or more analysis modules (54) that perform various analyses as described above. One or more of these modules (38-54) may be stored at least partially in the memory of a computing system and communicate with one or more micro-processors (e.g., central processing units) or other parts of one or more computing systems via one or more computer buses 56 (e.g., a memory bus, a system bus, a front-side-bus, an internal data bus, etc.)

Figure 8:
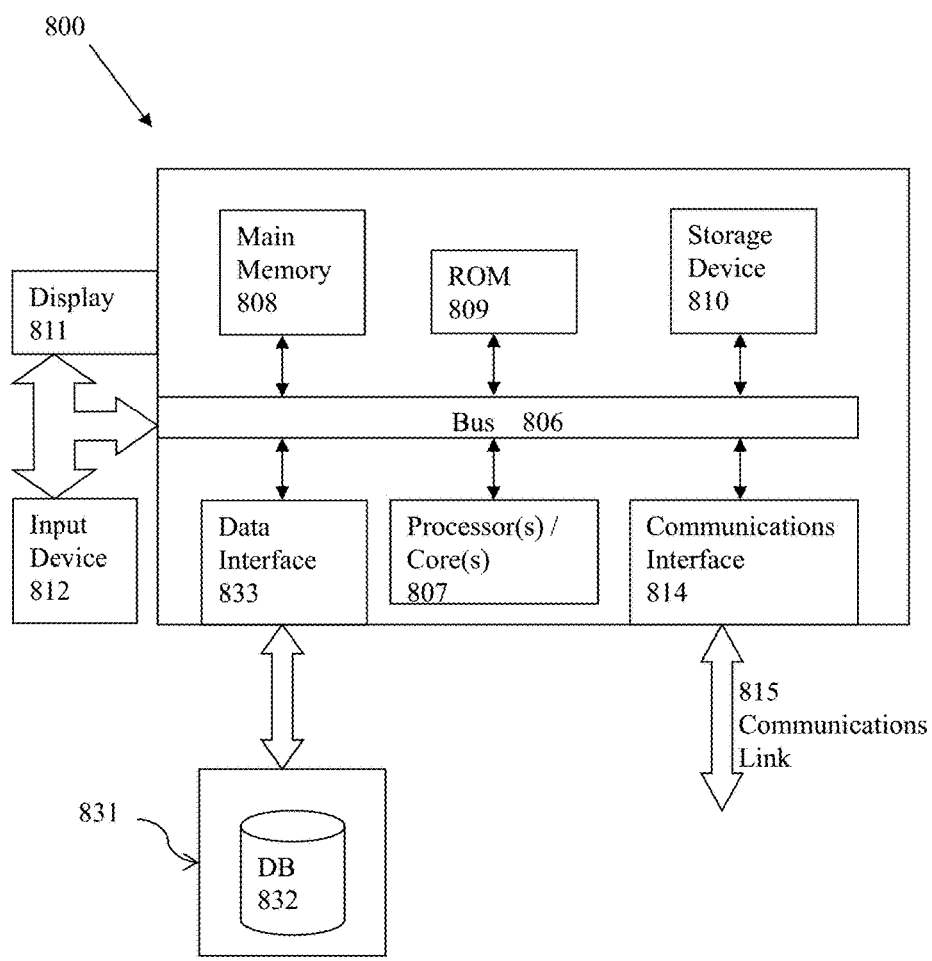
FIG. 8 illustrates a block diagram of an illustrative computing system suitable for implementing end-to-end automation of software services described herein.

Referring to FIG. 8, a block diagram of components of an illustrative computing system 800 suitable for implementing various embodiments of the invention is illustrated. For example, the exemplary computing system 800 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 800 includes a bus 806 or other communication mechanism for communicating information, which interconnects subsystems and devices, such as processor 807, system memory 808 (e.g., RAM), static storage device 909 (e.g., ROM), disk drive 810 (e.g., magnetic or optical), communication interface 814 (e.g., modem or Ethernet card), display 811 (e.g., CRT or LCD), input device 812 (e.g., keyboard), and cursor control (not shown).

According to one embodiment of the invention, computer system 800 performs specific operations by one or more processors or processor cores 807 executing one or more sequences of one or more instructions contained in system memory 808. Such instructions may be read into system memory 808 from another computer readable/usable storage medium, such as static storage device 809 or disk drive 810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in some embodiments, the one or more processors or processor cores 807 may be used to perform various actions such as various actions, processes, or modules involving determining, analyzing, performing actions, etc. In some embodiments, at least one of the one or more processors or processor cores 807 has the multithreading capability.

In one embodiment, the term "logic" shall mean any combination of software or hardware that is used to implement all or part of the invention. In the single embodiment or in some embodiments, the one or more processors or processor cores 807 may be used to perform various acts such as various acts involving determining, analyzing, performing actions, etc. In some embodiments, at least one of the one or more processors or processor cores 807 has the multithreading capability to execute a plurality of threads to perform various tasks as described in the preceding sections.

Various actions as described in the preceding paragraphs may be performed by using one or more processors, one or more processor cores, or combination thereof 807. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 900. According to other embodiments of the invention, two or more computer systems 800 coupled by communication link 815 (e.g., LAN, PTSN, or wireless network) may perform the sequence of instructions required to practice the invention in coordination with one another.

Computer system 800 may transmit and receive messages, data, and instructions, including program, i.e., application code, through communication link 815 and communication interface 814. Received program code may be executed by processor 807 as it is received, and/or stored in disk drive 810, or other non-volatile storage for later execution. In an embodiment, the computer system 800 operates in conjunction with a data storage system 831, e.g., a data storage system 831 that contains a database 832 that is readily accessible by the computer system 800. The computer system 800 communicates with the data storage system 831 through a data interface 833. A data interface 933, which is coupled to the bus 806, transmits and receives electrical, electromagnetic or optical signals that include data streams representing various types of signal information, e.g., instructions, messages and data. In embodiments of the invention, the functions of the data interface 833 may be performed by the communication interface 814.

In the foregoing specification, embodiments have been described with reference to the figures. It will, however, be evident that various modifications and changes may be made thereto without departing from the broader spirit and scope of the invention, and that figures and examples provided are not provided to limit the scope of embodiments. Thus, the specification and drawings are, accordingly, to be regarded in an illustrative rather than restrictive sense.

It shall also be noted that where methods or processes described above indicate certain processes or events occurring in certain order, those of ordinary skill in the art having the benefit of this disclosure would recognize that the ordering may be modified and that such modifications are in accordance with the variations of the invention. Additionally, parts of methods may be performed concurrently in a parallel processing paradigm. Nonetheless, the concurrent or parallel processing of these parts does not exclude the possibility of performing these parts sequentially. Accordingly, embodiments are intended to exemplify alternatives, modifications, and equivalents that may fall within the scope of the claims.

What is claimed is:

1. A computer implemented method for implementing end-to-end automation of software services, comprising:
one or more computing nodes connected to at least a software system via one or more computer networks, wherein the software system further comprises a billing service module that provides one or more software services to a plurality of users, the one or more computing nodes performing a process, and the process comprising:
identifying or determining a set of test cases for a software system;
determining, at a virtual time or date module stored in memory and functioning in conjunction with at least one microprocessor, at least one harmless temporal period between a first time or date and a virtual time or date ensuing the first time or date based at least in part upon respective occurrences or respective types of significant events in the set of test cases;
generating a reduced set of test cases at least by discarding one or more events that have been determined as insignificant in the at least one harmless temporal period from the set of test cases;
generating virtual test results at least by executing at least some of the reduced set of test cases in parallel on the software system for a virtual temporal period pertaining to the virtual time or date;
validating or verifying behaviors of the software system with at least the virtual test results; and
advancing the virtual time or date by a temporal period for executing the reduced set of test cases in parallel on the software system until a stopping criterion is satisfied.

2. The computer implemented method of claim 1, the process further comprising:
identifying or determining the set of test cases based in part or in whole upon one or more scenarios of user interactions with the software system; and
determining the virtual time or date based at least in part or in whole upon information in the set of test cases.

3. The computer implemented method of claim 2, the process further comprising:
executing the set of test cases in parallel in one or more test sessions on the one or more computing nodes for the temporal period;
performing, at the billing service module, virtual billing services at least by generating virtual billing records and notifications for the temporal period; and
transmitting the virtual billing records and notifications to the one or more test sessions, the set of test cases, or a repository accessible by the set of test cases.

4. The computer implemented method of claim 1, the process further comprising:
identifying one or more first test cases from the set of test cases;
determining whether the virtual test results generated by executing the software system include pertinent virtual test results for the one or more first test cases;
validating or verifying the behaviors of the software system with at least the pertinent virtual test results for the one or more first test cases; and
determining whether an end virtual time or date has been reached.

5. The computer implemented method of claim 1, the process further comprising:
identifying a first test case from the set of test cases; and
performing error or issue handling for the first test case.

6. The computer implemented method of claim 5, the process further comprising:
determining whether the virtual test results include pertinent virtual test results for the first test case;
validating or verifying the behaviors of the software system with at least the pertinent virtual test results for the first test case;
determining whether an error or an issue has occurred for the first test case based in part or in whole upon results of validating or verifying the behaviors of the software system with at least the pertinent virtual test results for the first test case; and
terminating or pausing execution of the first test case in a first test session when it is determined that the error or the issue has occurred for the first test case.

7. The computer implemented method of claim 6, the process further comprising:
determining whether the first test case, which has been terminated or paused, is to be rejoined into the set of test cases executing in parallel.

8. The computer implemented method of claim 7, the process further comprising:
identifying a first virtual time or date on which the first test case is terminated or paused;
identifying a current virtual time or date for the software system;
determining whether one or more significant events have occurred between the first virtual time or date and the current virtual time or date; and
determining whether rejoining the first test case into the set of test cases affects behaviors of one or more other test cases.

9. The computer implemented method of claim 8, the process further comprising:
determining or predicting a scope of extent of impacts of rejoining the first test case into the set of test cases;
determining modifications to the first test case or the software system for resolving the error or the issue;
adjusting the scope of extent of impacts of rejoining the first test case into the set of test cases based in part or in whole upon the modifications; and
implementing the modifications to the first test case or the software system based in part or in whole upon one or more first criteria.

10. The computer implemented method of claim 9, the process further comprising:
rejoining the first test case into the set of test cases based in part or in whole upon one or more second criteria; and
synchronizing the first test case to the current virtual time or date at least by retrieving pertinent virtual test results and notifications based in part or in whole upon occurrence and type of one or more significant events between the first virtual time or date and the current virtual time or date.

11. The computer implemented method of claim 10, the process further comprising:

determining a no-harm virtual time or date between the first virtual time or date and the current virtual time or date for the at least one harmless temporal period when it is determined that one or more non-harmless significant events occurred between the first virtual time or date and the current virtual time or date; and identifying one or more affected test cases from the set of test cases into the reduced set of test cases when the current virtual time or date is reset to the no-harm virtual time or date.

12. The computer implemented method of claim 11, the process further comprising:

resetting the current virtual time or date to the first virtual time or date; and generating first updated virtual test results for the reduced set of test cases at least by re-executing the reduced set of test cases during a first time period between the first virtual time or date and the no-harm virtual time or date.

13. The computer implemented method of claim 12, the process further comprising:

resetting the current virtual time or date to the no-harm virtual time or date; and generating second updated virtual test results for the first test case at least by re-executing the first test case during a second time period between the no-harm virtual time or date and the current virtual time or date.

14. A system for implementing end-to-end automation of software services, comprising:

one or more computing nodes connected to at least a software system via one or more computer networks, wherein the software system further comprises a billing service module that provides one or more software services to a plurality of users;

the one or more computing nodes configured to identify or determine a set of test cases for a software system;

computer memory configured to store at least a part of the software system that, when executed, causes the one or more computing nodes to:

determine, at a virtual time or date module stored in memory and functioning in conjunction with at least one microprocessor, at least one harmless temporal period between a first time or date and a virtual time or date ensuing the first time or date based at least in part upon respective occurrences or respective types of significant events in the set of test cases;

generating a reduced set of test cases at least by discarding one or more events that have been determined as insignificant in the at least one harmless temporal period from the set of test cases; and generate virtual test results at least by executing the set of test cases in parallel on the software system for a virtual temporal period pertaining to the virtual time or date;

the one or more computing nodes further configured to validate or verify behaviors of the software system with at least the virtual test results; and a virtual time module stored at least in part in the memory and configured to advance the virtual time or date by a temporal period for executing the reduced set of test cases in parallel on the software system until a stopping criterion is satisfied.

15. The system of claim 14, further comprising:

at least one of the one or more computing nodes configured to identify a first test case from the set of test cases;

the computer memory configured to store at least a part of an error or issue handling module that is executed to perform error or issue handling for the first test case;

the one or more computing nodes further configured to determine whether the virtual test results include pertinent virtual test results for the first test case;

the computer memory configured to store at least a part of a validation or verification module that is executed to validate or verify the behaviors of the software system with at least the pertinent virtual test results for the first test case;

the at least one of the one or more computing nodes further configured to determine whether an error or an issue has occurred for the first test case based in part or in whole upon results of validating or verifying the behaviors of the software system with at least the pertinent virtual test results for the first test case; and the at least one of the one or more computing nodes further configured to terminate or pause execution of the first test case in a first test session when it is determined that the error or the issue has occurred for the first test case.

16. The system of claim 15, further comprising:

the at least one of the one or more computing nodes further configured to determine whether the first test case, which has been terminated or paused, is to be rejoined into the set of test cases executing in parallel.

17. The system of claim 16, further comprising:

the virtual time module that is stored at least in part in the computer memory and is executed by at least one micro-processor of a computing system to identify a first virtual time or date on which the first test case is terminated or paused;

the virtual time module that is stored at least in part in the computer memory and is executed by at least one micro-processor to identify a current virtual time or date for the software system;

the at least one of the one or more computing nodes further configured to determine whether one or more significant events have occurred between the first virtual time or date and the current virtual time or date; and the at least one of the one or more computing nodes further configured to determine whether rejoining the first test case into the set of test cases affects behaviors of one or more other test cases.

18. The system of claim 17, further comprising:

the computing system further configured to determine or predict a scope of extent of impacts of rejoining the first test case into the set of test cases;

the computing system further configured to determine modifications to the first test case or the software system for resolving the error or the issue;

the computing system further configured to adjust the scope of extent of impacts of rejoining the first test case into the set of test cases based in part or in whole upon the modifications; and the computing system further configured to implement the modifications to the first test case or the software system based in part or in whole upon one or more first criteria.

19. The system of claim 18, further comprising:

the at least one of the one or more computing nodes further configured to rejoin the first test case into the set of test cases based in part or in whole upon one or more second criteria; and the at least one of the one or more computing nodes further configured to synchronize the first test case to the current virtual time or date at least by retrieving pertinent virtual test results and notifications based in part or in whole upon occurrence and type of one or more significant events between the first virtual time or date and the current virtual time or date.

20. The system of claim 19, further comprising:
the virtual time module further configured to determine a no-harm virtual time or date between the first virtual time or date and the current virtual time or date when it is determined that one or more non-harmless significant events occurred between the first virtual time or date and the current virtual time or date; and
the computing system further configured to identify one or more affected test cases from the set of test cases into a reduced set of test cases when the current virtual time or date is reset to the no-harm virtual time or date.

21. A computer program product comprising a non-transitory machine readable storage medium having stored thereupon at least a software system comprising a virtual time module which, when executed by one or more computing systems, causes the one or more computing systems to perform a set of acts for implementing end-to-end automation of software services, the set of acts comprising:
one or more computing nodes connected to at least a software system via one or more computer networks, wherein the software system further comprises a billing service module that provides one or more software services to a plurality of users, the one or more computing nodes performing a process, and the process comprising:
identifying or determining a set of test cases for a software system;
determining, at a virtual time or date module stored in memory and functioning in conjunction with at least one microprocessor, at least one harmless temporal period between a first time or date and a virtual time or date ensuing the first time or date based at least in part upon respective occurrences or respective types of significant events in the set of test cases;
generating a reduced set of test cases at least by discarding one or more events that have been determined as insignificant in the at least one harmless temporal period from the set of test cases;
generating virtual test results at least by executing the set of test cases in parallel on the software system for a virtual temporal period pertaining to the virtual time or date;
validating or verifying behaviors of the software system with at least the virtual test results; and
advancing the virtual time or date by a temporal period for executing the reduced set of test cases in parallel on the software system until a stopping criterion is satisfied.

22. The computer program product of claim 21, the set of acts further comprising:
identifying a first test case from the set of test cases; and performing error or issue handling for the first test case.

23. The computer program product of claim 22, the set of acts further comprising:
determining whether the virtual test results include pertinent virtual test results for the first test case;
validating or verifying the behaviors of the software system with at least the pertinent virtual test results for the first test case;
determining whether an error or an issue has occurred for the first test case based in part or in whole upon results of validating or verifying the behaviors of the software system with at least the pertinent virtual test results for the first test case; and
terminating or pausing execution of the first test case in a first test session when it is determined that the error or the issue has occurred for the first test case.

24. The computer program product of claim 23, the set of acts further comprising:
determining whether the first test case, which has been terminated or paused, is to be rejoined into the set of test cases executing in parallel;
identifying a first virtual time or date on which the first test case is terminated or paused;
identifying a current virtual time or date for the software system;
determining whether one or more significant events have occurred between the first virtual time or date and the current virtual time or date; and
determining whether rejoining the first test case into the set of test cases affects behaviors of one or more other test cases.

25. The computer program product of claim 24, the set of acts further comprising:
determining or predicting a scope of extent of impacts of rejoining the first test case into the set of test cases;
determining modifications to the first test case or the software system for resolving the error or the issue;
adjusting the scope of extent of impacts of rejoining the first test case into the set of test cases based in part or in whole upon the modifications; and
implementing the modifications to the first test case or the software system based in part or in whole upon one or more first criteria.

26. The computer program product of claim 25, the set of acts further comprising:
rejoining the first test case into the set of test cases based in part or in whole upon one or more second criteria;
synchronizing the first test case to the current virtual time or date at least by retrieving pertinent virtual test results and notifications based in part or in whole upon occurrence and type of one or more significant events between the first virtual time or date and the current virtual time or date;
determining a no-harm virtual time or date between the first virtual time or date and the current virtual time or date when it is determined that one or more non-harmless significant events occurred between the first virtual time or date and the current virtual time or date; and
identifying one or more affected test cases from the set of test cases into a reduced set of test cases when the current virtual time or date is reset to the no-harm virtual time or date.

27. The computer program product of claim 26, the set of acts further comprising:
resetting the current virtual time or date to the first virtual time or date;
generating first updated virtual test results for the reduced set of test cases at least by re-executing the reduced set of test cases during a first time period between the first virtual time or date and the no-harm virtual time or date;
resetting the current virtual time or date to the no-harm virtual time or date; and
generating second updated virtual test results for the first test case at least by re-executing the first test case during a second time period between the no-harm virtual time or date and the current virtual time or date.

* * * * *